(12) United States Patent
Durham et al.

(10) Patent No.: US 7,726,476 B2
(45) Date of Patent: Jun. 1, 2010

(54) OPTICAL MEDIA STORAGE PACKAGE

(76) Inventors: Larry Dean Durham, 104 Ivy Hollow La., Mooresville, NC (US) 28117; Nickie Joan Durham, 104 Ivy Hollow La., Mooresville, NC (US) 28117

(*) Notice: Subject to any disclaimer, the term of this patent is extended or adjusted under 35 U.S.C. 154(b) by 364 days.

(21) Appl. No.: 11/695,870

(22) Filed: Apr. 3, 2007

(65) Prior Publication Data
US 2007/0235356 A1    Oct. 11, 2007

Related U.S. Application Data

(60) Provisional application No. 60/789,783, filed on Apr. 6, 2006.

(51) Int. Cl.
*B65D 85/30* (2006.01)
(52) U.S. Cl. ................... 206/308.1; 206/1.5
(58) Field of Classification Search ......... 206/1.5, 206/308.1, 312, 303, 445, 449; 312/9.11, 312/9.16, 9.17, 9.21, 9.22, 9.23, 9.24, 9.25, 312/9.26, 9.58
See application file for complete search history.

(56) References Cited

U.S. PATENT DOCUMENTS

| 5,713,464 A * | 2/1998 | Chang ............... 206/308.1 |
| 5,799,782 A * | 9/1998 | Gelardi ............. 206/308.1 |
| 6,283,283 B1 * | 9/2001 | Rufo et al. ......... 206/308.1 |
| 2005/0011784 A1 * | 1/2005 | Ulrich .............. 206/308.1 |

* cited by examiner

*Primary Examiner*—J. Gregory Pickett
(74) *Attorney, Agent, or Firm*—Trego, Hines & Ladenheim, PLLC

(57) ABSTRACT

A media disc storage package includes: a folder including at least first and second spaced-apart panels defining a space for enclosing a media disc; and a substantially rigid insert disposed between the panels. The insert spans the distance between the panels to provide structural support to the folder, and includes an open disc well adapted to hold the media disc in the space between the panels.

10 Claims, 34 Drawing Sheets

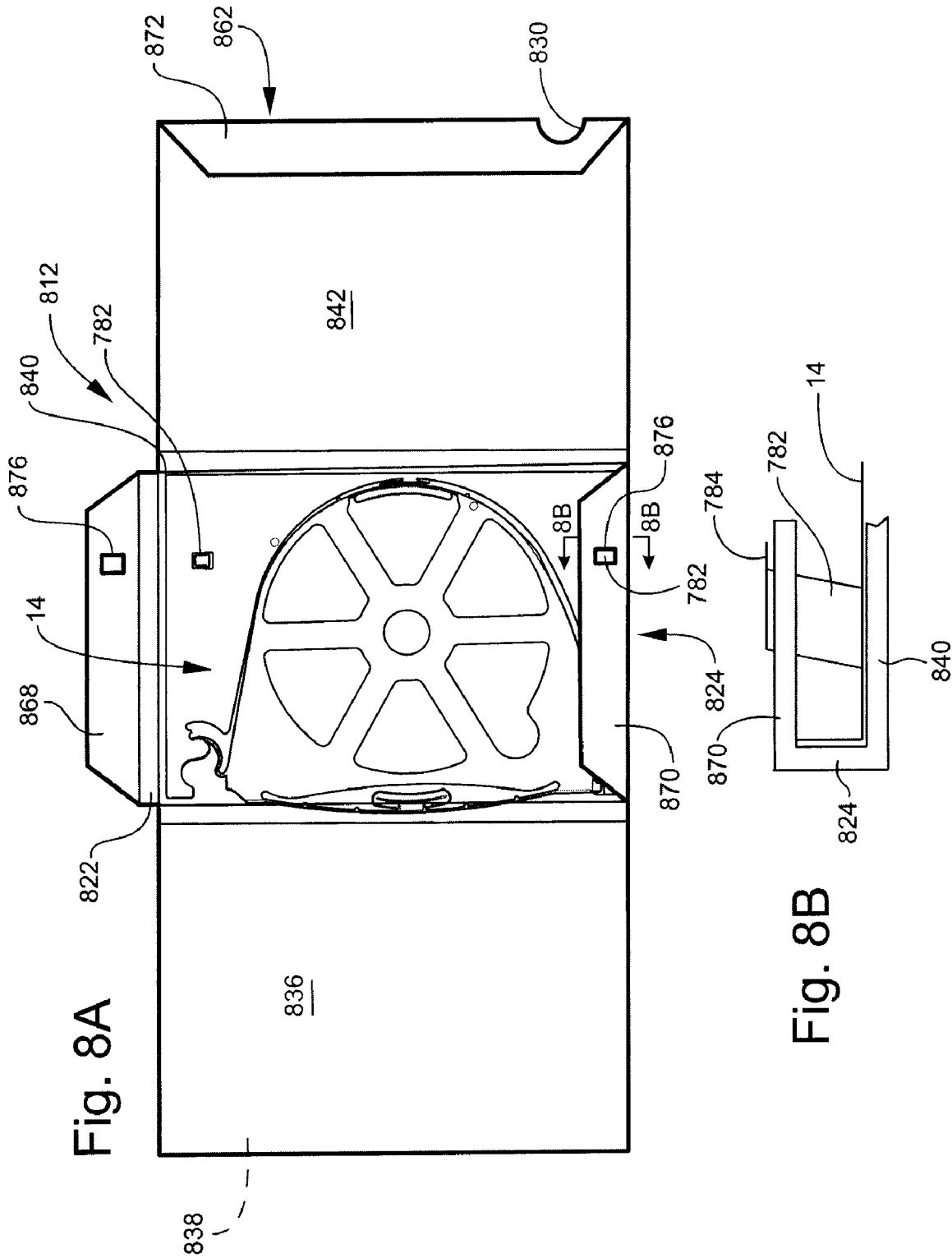

OPTICAL MEDIA STORAGE PACKAGE

BACKGROUND OF THE INVENTION

This invention relates to containers for holding machine readable storage media, and more particularly to a storage package intended for removably storing a recorded medium upon which information retrievable by reflected or refracted light is stored, and which features a folder formed from a prescored, unitary blank which is wrapped about and adhesively bonded to a disc tray to define the package.

Media disc storage packages that utilize trays for holding one or more discs in combination with folders formed from paperboard or other suitable substrates are well known in the art. Such packages commonly include a disc tray made of injection-molded plastic positioned within one or more panels, or pages, of a plastic or paperboard substrate. Such packages are also commonly assembled using processes involving multiple steps performed with parts that are shipped to more than one location before the final packages are assembled. In particular, such processes often require that the folders and trays be assembled by one manufacturer, and then shipped to a separate manufacturer so that discs can be placed within the trays. The folders used in these packages are often folded and held together using tuck tabs and slit locks, which achieves closed, but not securely sealed, packages. The trays are often formed from several components, each of which must be custom-molded using a distinct injection molding process.

Although media storage packages do exist in which component assembly, including disc placement, is fully automated, such packages require that a top spine sticker and a security sticker be separately manufactured and then placed on the top spine and left side of the package after assembly and prior to sale.

SUMMARY OF THE INVENTION

These and other shortcomings of the prior art are addressed by the present invention, which provides a media storage package having an insert and folder which may be assembled together with a disc during an automated, servo-driven process. Specifically, the disc is positioned within the tray, which is then wrapped within a pre-scored, die-cut blank. The blank has panels and spines upon which graphic information can be pre-printed prior to wrapping the blank around the tray, which eliminates the need for top spine and security labels. The blank also features glue tabs which may be adhesively bonded to selected panels of the blank and side rims of the tray during assembly to form a completed package having spines superimposed over all four side rims of the tray. The inserts utilized in the subject invention may be molded from a single injection molding process, and include several features designed to reduce the weight, and thus the cost, of the assembled package. Importantly, the package described herein, both the paper and plastic portions, may be made from recycled materials, including post-consumer waste, in contrast to prior art packages which in many cases must be made from virgin materials to achieve an acceptable product.

According to one aspect of the invention, a media disc storage includes a folder comprising at least first and second spaced-apart panels defining a space for enclosing a media disc; and a substantially rigid insert disposed between the panels. The insert spans the distance between the panels to provide structural support to the folder, and including an open disc well adapted to hold the media disc in the space between the panels.

According to another aspect of the invention, a media disc storage package, includes a folder comprising at least first and second spaced-apart panels defining a space for enclosing a media disc; spines interconnecting the first and second panels to form a substantially continuous outer surface which includes an open side edge; and a substantially rigid insert disposed between the panels. The insert spans the distance between the panels to provide structural support to the folder, and includes an open disc well adapted to hold the media disc in the space between the panels. The insert has a frame having an outer perimeter circumscribed by the perimeter of the panels; and a tray carried by the frame, the tray defining an open disc well adapted to hold the media disc in the space between the panels.

The tray is moveable, in a plane generally parallel to the first and second panels, between: a first position in which the disc well is disposed inside the space between the panels, and a second position in which the tray extends through the open side edge and the disc well is exposed for placement or retrieval of a disc.

According to another aspect of the invention, an insert for a media disc storage package includes a generally planar floor; at least one upstanding rim extending from the floor so as to define an open disc well adapted to receive and locate a media disc therein; and a spring locking mechanism having: a flexible spring having at least one end connected to the insert; and a latch extending laterally from the spring. The latch is moveable with the spring, in a plane generally parallel to the first floor, between a first position in which at least a portion of the latch overlies the disc well; and a second position in which the latch is clear of the disc well.

BRIEF DESCRIPTION OF THE DRAWINGS

The invention may be best understood by reference to the following description taken in conjunction with the accompanying drawing figures in which:

FIG. 8A is a top plan view of a blank for use with the insert of FIG. 6;

FIG. 8B is a view taken along lines 8B-8B of FIG. 8A;

DETAILED DESCRIPTION OF THE INVENTION

Figure 1:
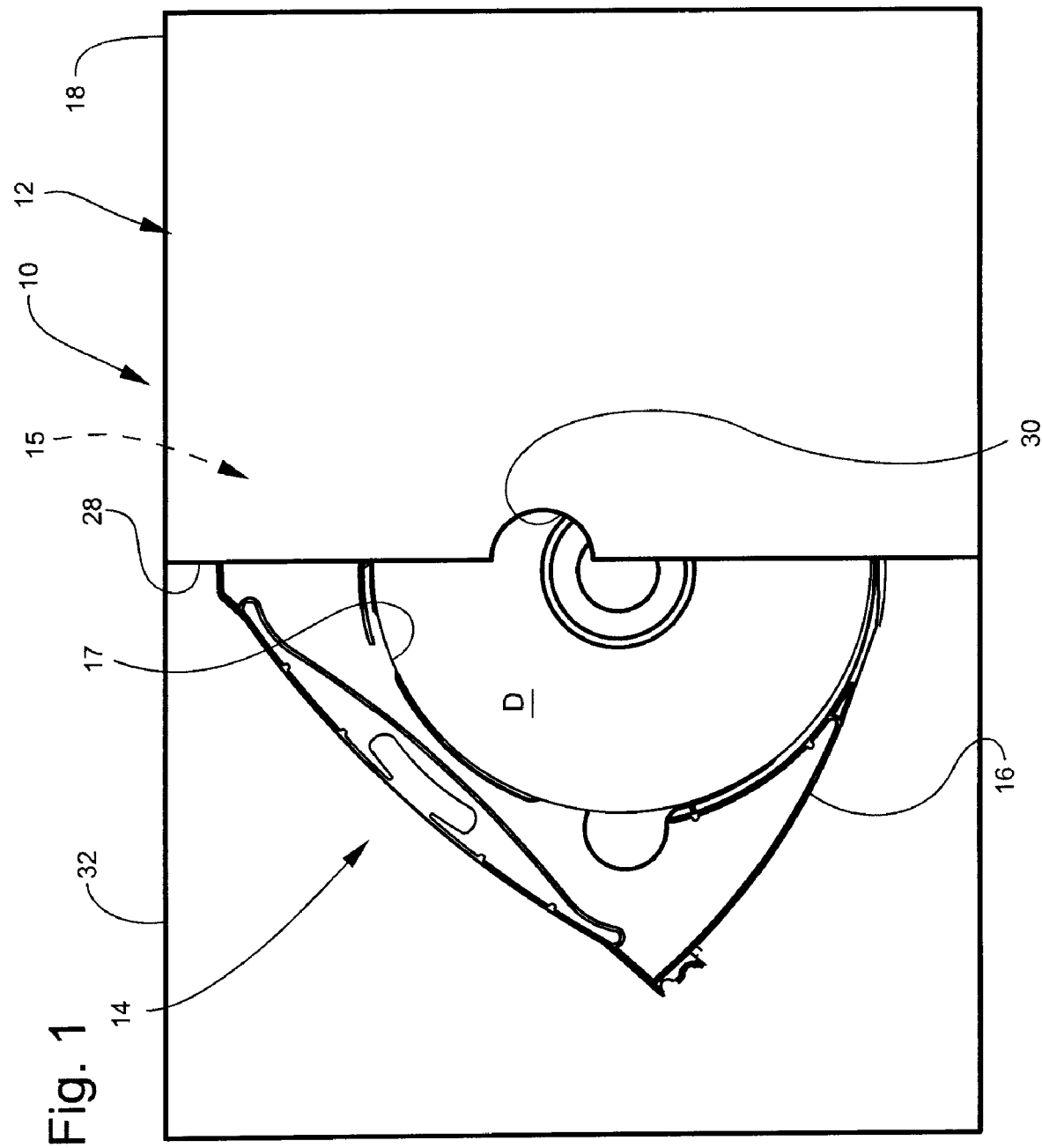
FIG. 1 is a top view of a media storage package according to one aspect of the invention, showing an insert thereof in a partially-extended position.

Referring now specifically to the drawings wherein like numerals indicate like or corresponding parts throughout the several views, an optical media storage package according to one embodiment of the invention is illustrated in FIG. 1 and shown generally at reference numeral 10. The storage package 10 includes a folder 12 wrapped about a disc insert 14. The insert 14 includes a frame 15 and a tray 16 that has a well 17 within which an optical disc "D" may be placed. As used herein, the term "insert" is meant to include a frame, a tray, or a combination of both a frame and a tray, or any other equivalents thereof.

While the storage package may utilize a disc insert formed from any suitable materials, the insert 14 is preferably formed from injection molded plastic. One example of a suitable material is polypropylene. The design aspects of the insert 14, for example the fact that it is normally hidden from view, and that it does not require long, 180-degree opening live hinges, allow it to be readily made from recycled pre- or post-consumer recycled plastics (e.g. ground-up plastic waste material or "regrinds"). Furthermore, although the disc "D" shown in FIG. 1 is a conventional compact disc, those skilled in the art will appreciate that the invention can be utilized with other optical discs, including but not limited to Fluorescent Versatile Discs, Digital Versatile Discs ("DVD"), High Definition Versatile Discs, Blu-ray Discs, multilayer optical discs, enhanced versatile discs, MiniDiscs, Holographic Discs, and Universal Media Discs. The invention can also be used with any other discs that are configured to include encoded information. Such discs include, but are not limited to, those configured for mechanically or magnetically recorded data, regardless of the size or use of the disc.

Figure 2:
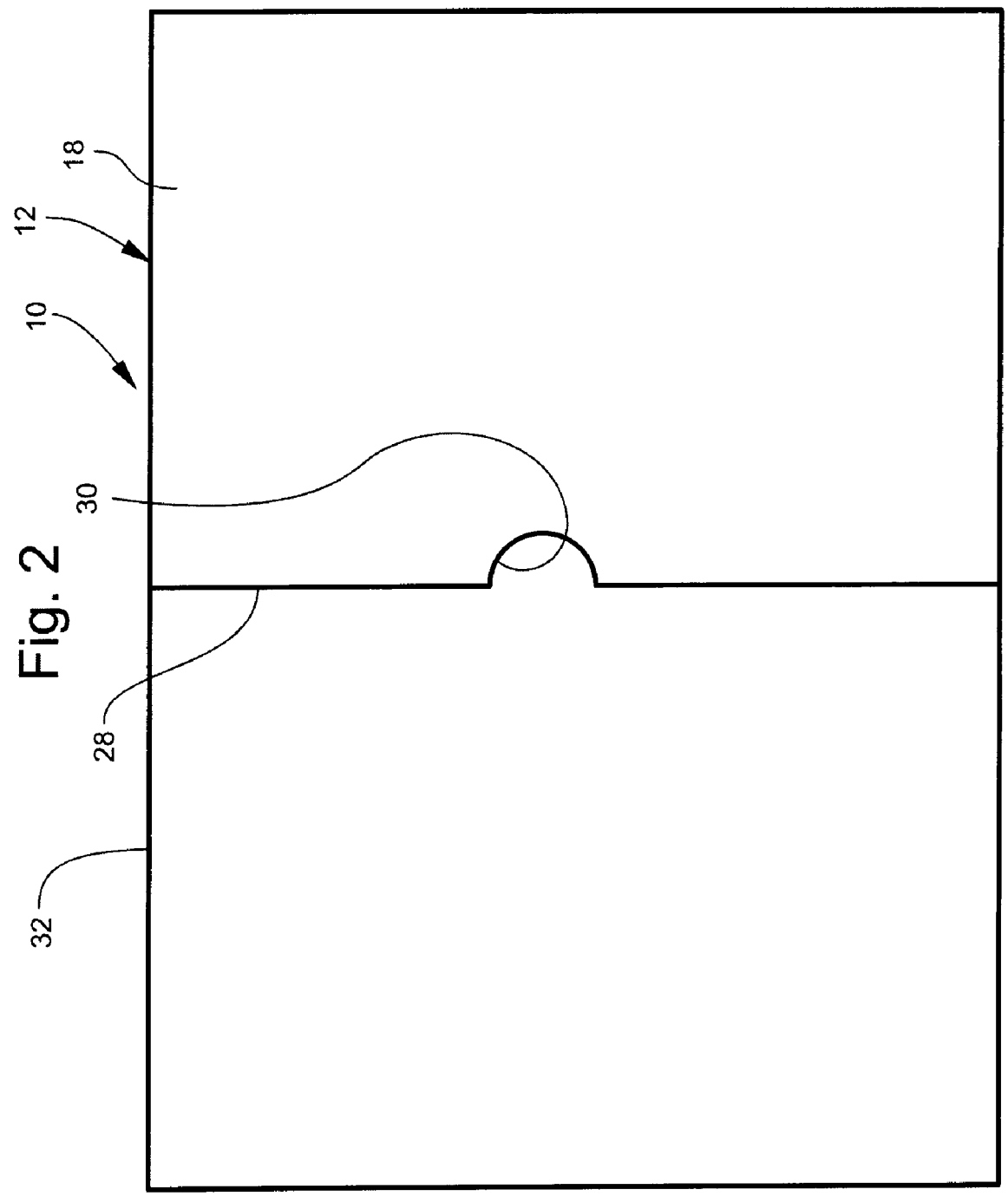
FIG. 2 is a top view of the media storage package of FIG. 1, with the insert retracted.

Referring now to FIG. 2 and described in greater detail below with reference to FIGS. 2 through 5, the folder 12 includes front and back walls 18, 20, an upper spine 22, lower spine 24, and side spines 26, 29 that are configured, wrapped and optionally adhesively bonded in place around the frame 15 during assembly to completely enclose the insert 14 and disc "D" within the folder 12. The walls 18, 20 and spines 22, 24 extend to a side edge 28 that defines an opening through which the tray 16 is removed from the folder. As is shown in FIG. 2, a notch 30 is formed along the side edge 28 to permit an end user to grasp and remove the tray 16 from the folder 12 to access the disc "D". The storage package 10 is shown in FIG. 1 with the tray 16 extending through the opening. The tray 16 is pivotally connected to the frame 15, which permits the tray 16 to move between the open position shown in FIG. 1 to the closed position shown in FIG. 2. In FIG. 1, the tray 16 is shown partially extended such that the disc D is partially exposed and may be placed into or removed from the disc well 17. If desired, the tray 16 may be further opened or extended to fully expose the disc D. A cover 32 extends from the back wall 20 and can be folded over the side edge 28 and front wall 18 to close the package 10.

Figure 3:
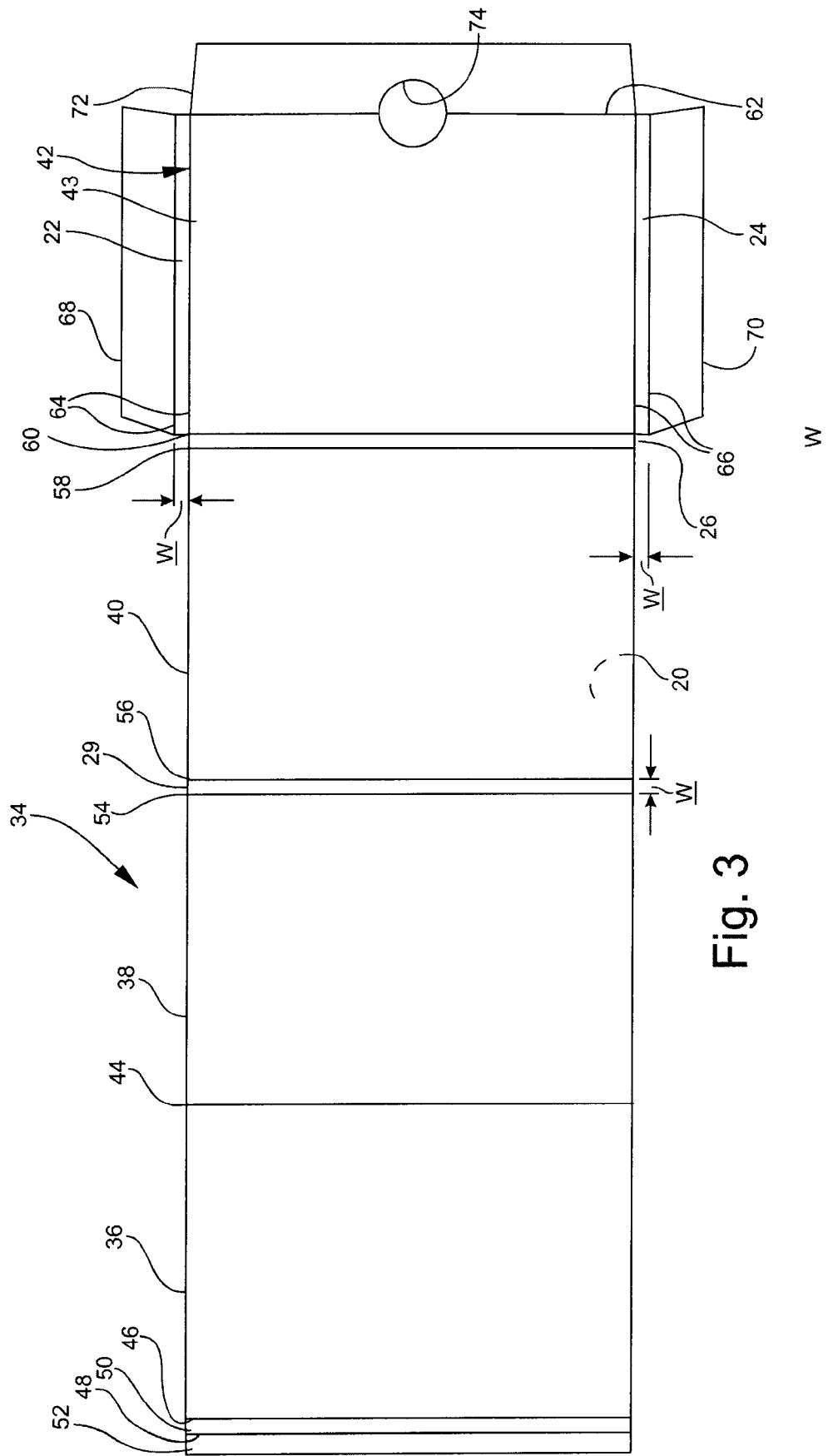
FIG. 3 is a top view of a blank for the storage package of FIG. 1.

Referring now to FIG. 3, the folder 12 is preferably formed from a unitary blank 34. While the blank 34 may comprise any suitable substrate, the blank 34 is preferably pre-sized, die-cut from paperboard, and scored to form hinges, which in turn define the various components of the folder 12. The blank 34 may be made from recycled paperboard or other pre- or post-consumer recycled fibrous materials. More specifically, the blank 34 includes first, second, third and fourth panels 36, 38, 40, 42. The first panel 36 extends between a cover hinge 44 and a first hinge 46. The first hinge 46 extends parallel to a second hinge 48 to form a cover spine 50 from which a cover tab 52 extends. The second panel 38 extends between the cover hinge 44 and a third hinge 54. The third panel 40 similarly extends between fourth and fifth hinges 56, 58.

Figure 4:
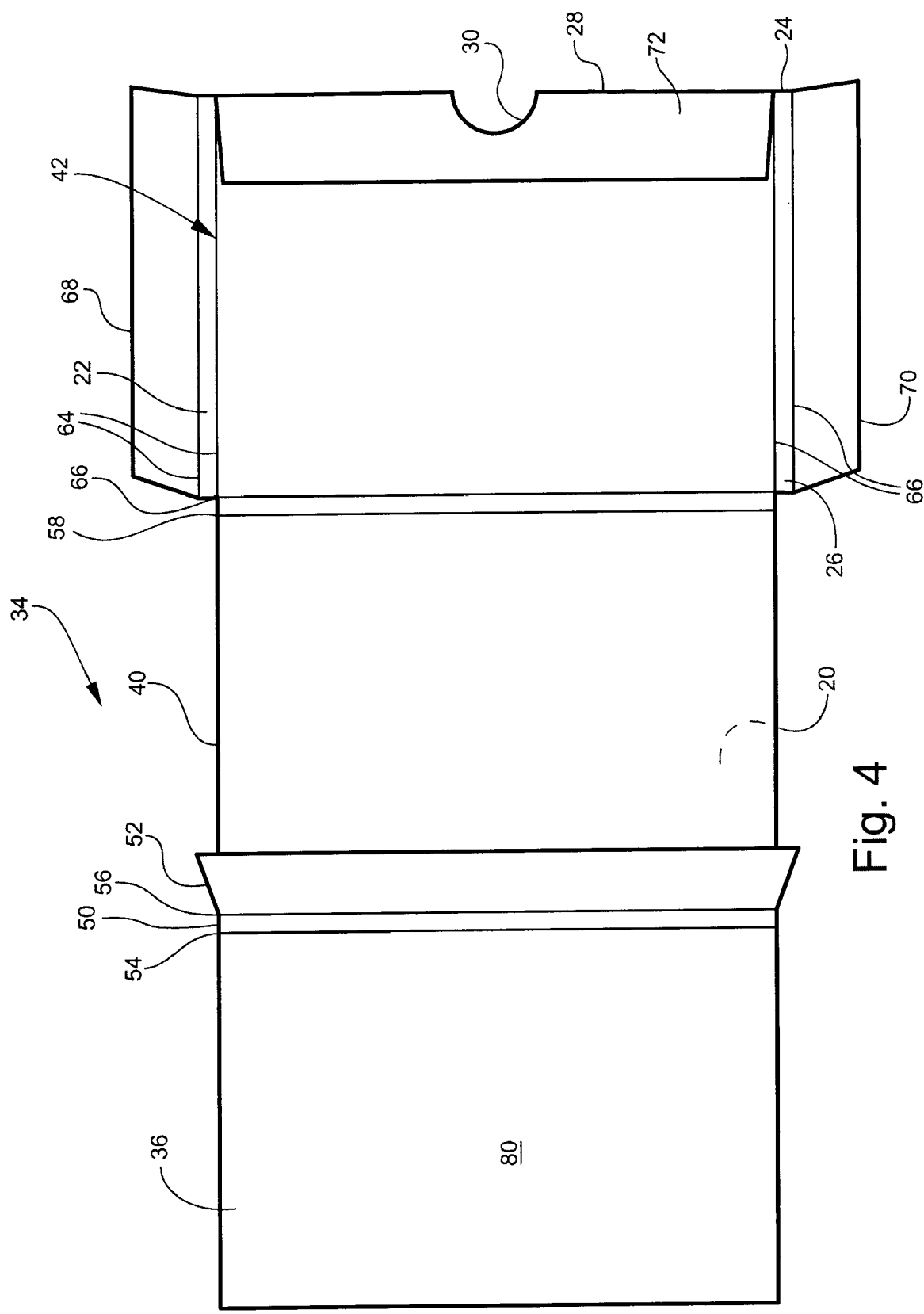
FIG. 4 is a top view of the blank of FIG. 3 in a partially-folded condition.

The fourth panel 42 has an interior surface 43, is interposed between a sixth hinge 60 and a side hinge 62, and extends between the upper and lower spines 22, 24. The spines 22, 24 are defined by respective upper and lower pairs of hinges 64, 66. As is shown in FIGS. 3 and 4, upper and lower glue tabs 68, 70 extend from the upper and lower spines 22, 24, respectively, and a side glue tab 72 extends from the side hinge 62. An opening 74 is located at the side hinge 62, and ultimately forms the notch 30 on the side edge 28 of the cover 32 shown in FIGS. 1 and 2.

Figure 5:
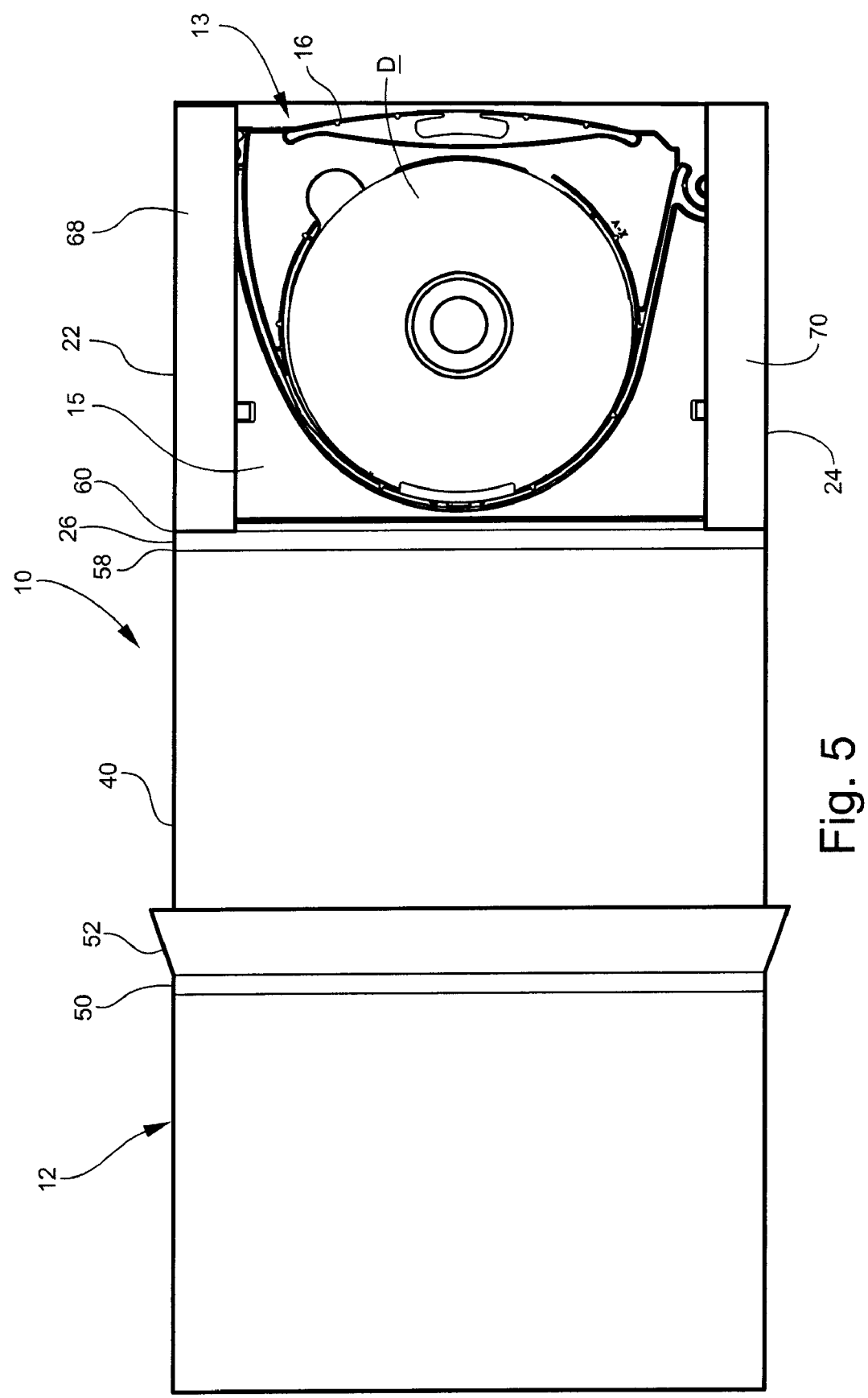
FIG. 5 is a top view of the blank of FIG. 3 with an insert placed therein.

Referring now to FIGS. 4 and 5, to assemble the storage package 10, the cover tab 52 and interior cover spine 50 are folded along the first and second hinges 46, 48 so that the cover tab 52 extends at an angle toward the outer surface 80 of the first panel 36. The first panel 36 is then folded along the cover hinge 44 with the panel 36 extending at an angle back toward the second panel 38. The upper glue tab 68 and spine 22, lower glue tab 70 and spine 24, and side glue tab 72 are likewise folded along the upper pair of hinges 64, lower pair of hinges 66 and side hinge 62, respectively, to extend toward the interior 43 of the fourth panel 42. As is shown in FIG. 5, the first panel 36 is then adhesively bonded to the second panel 38 with the interior cover spine 50 superimposed over the side spine 29, which gives the cover 32 a two-ply thickness and increased rigidity to protect the insert 14 and disc "D" wrapped within the folder 12.

Referring now to FIG. 4, the side glue tab 72 is folded along side hinge 62 and adhesively bonded to the interior of the fourth panel 42 to define the notch 30 and side edge 28. As is shown in FIG. 5, the blank 34 is then wrapped about the insert 14 by first positioning the tray 16 and disc "D" disposed face down on the fourth panel 42. The interior of the fourth panel 42 is then adhesively bonded to the frame 15. The upper and lower glue tabs 68, 70 are then folded over respective upper and lower ends 76, 78 of the insert 14 and adhered to the frame 15, so that the upper and lower spines 22, 24 completely cover the upper and lower ends 76, 78.

The fourth panel 42 and side spine 26 are next folded toward the third panel 40 along the fifth and sixth hinges 58, 60. The cover tab 52 is then disposed between the third panel 40 and the tray 16, and the upper and lower glue tabs 68, 70 are adhesively bonded to the interior of the third panel 40 to form the package 10.

Wrapping the blank 34 around the insert 14 in the manner illustrated in FIGS. 3 through 5 produces a package 10 in which there are spines 22, 24, 26, 29 covering all four sides of the frame 15. Adhesively bonding the glue tabs 68, 70, 72 to the interior of the third panel 40 further eliminates the use of standard folding technology, in which tuck tabs and slit locks are utilized to achieve closed, but loosely sealed, packages which require separate spine labels. In contrast, the package 10 has increased rigidity and does not require separate security stickers or top spine labels: all of the necessary graphic information can be printed directly on the spines and other surfaces of the folder 12.

Although the folder 12 shown in FIGS. 1 through 6 is designed to hold only one disc "D", the package 10 may alternatively be designed to hold up to ten discs by increasing the width "w" of each of the spines. In particular, for each additional disc added, the width "w" is increased by approximately 1.4 mm (0.055 in.); however, additions to the width "w" may vary depending upon the type of disc the final package is intended to hold.

Figure 6:
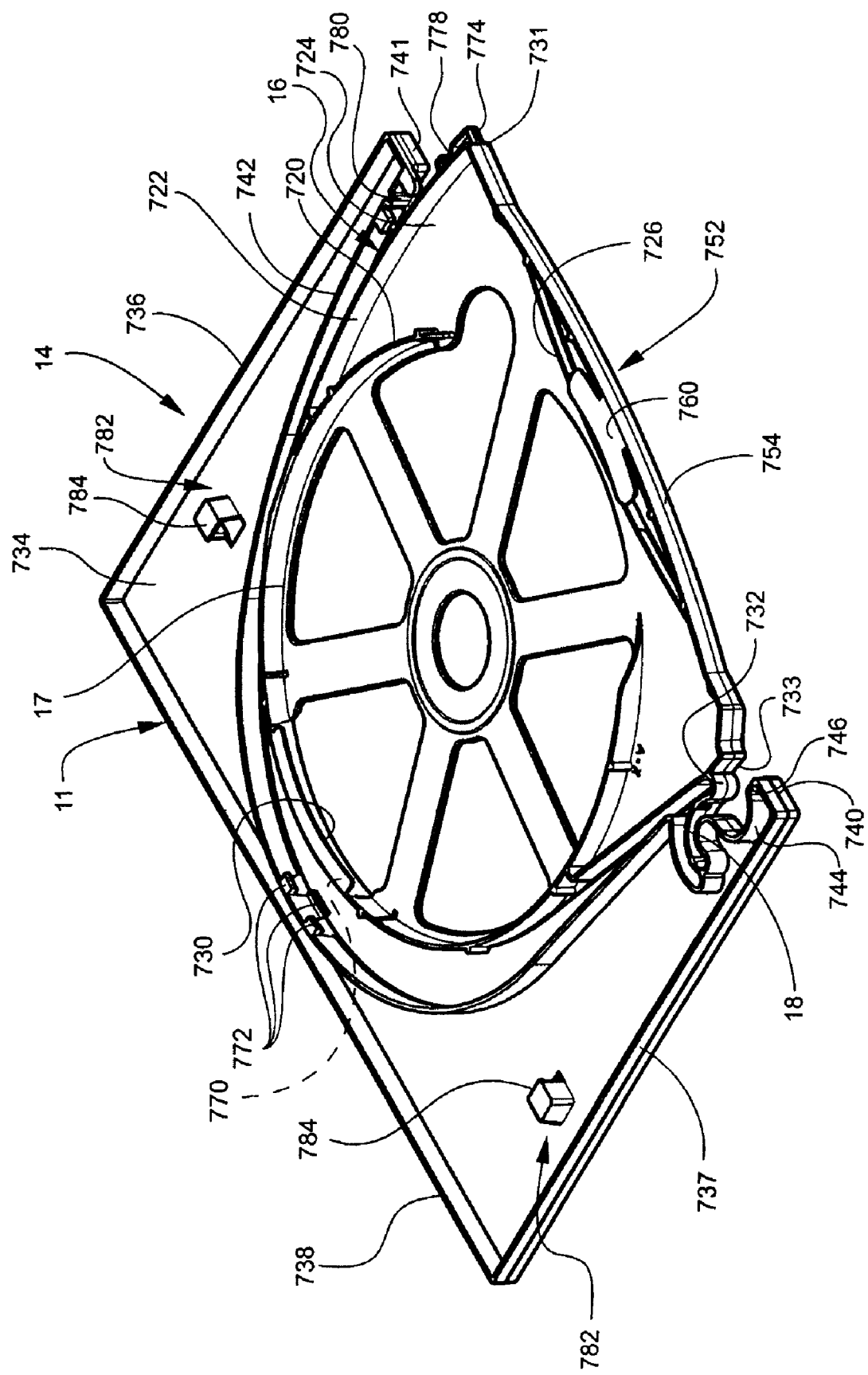
FIG. 6 is a perspective view of an insert constructed according to one aspect of the invention.
Figure 7:
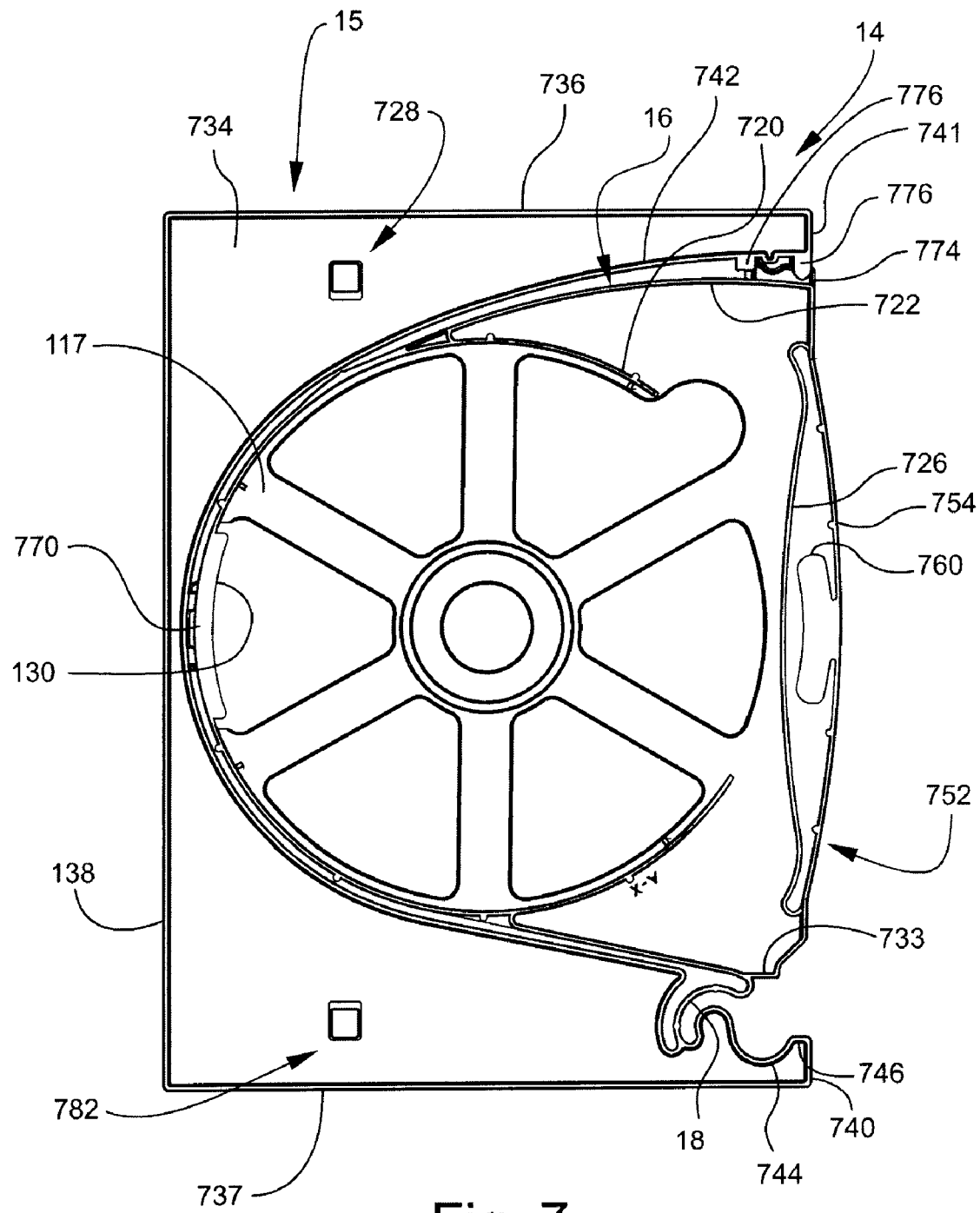
FIG. 7 is a top plan view of the insert of FIG. 6.
Figure 8:
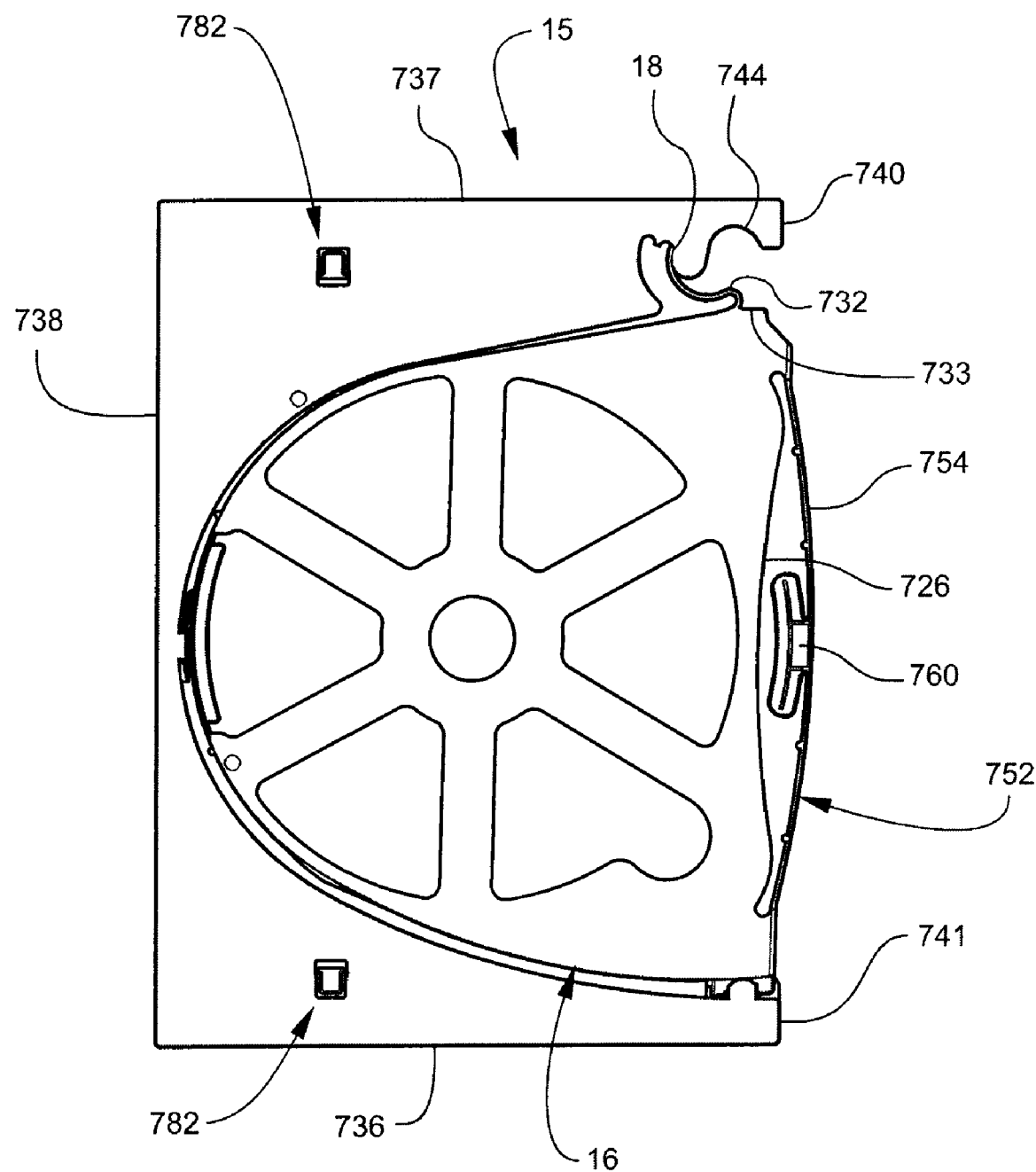
FIG. 8 is a bottom plan view of the insert of FIG. 6.

FIGS. 6 through 8 illustrate the insert 14 in more detail. The insert 14 includes integrally formed frame 15 and tray 16. A hinge 18 is likewise integrally formed with the frame 15 and tray 16, and operates to allow pivotal movement of the tray 16 relative to the frame 15. The tray 16 includes an outer rim 720. A reinforcing rim 722 extends from the outer rim 720. The outer rim 720 and reinforcing rim 722 cooperatively define a disc well 17 and a support floor 724 that both extend to a side edge 726.

The well 117 is protected by a disc keeper 730, which is disposed on the outer rim 722 and extends inwardly over the well 17 for maintaining a disc in place within the well 17.

The frame 15 has a floor 734 from which a pair of opposed lateral rims 736, 737, a transverse side rim 738 and outer rim segments 740, 741 extend. An inner rim 742 having a curved shape generally complimentary to that of the outer rim 722 extends from the rim segment 740 to the rim segment 741. The inner rim 742 includes an arcuate segment 744 formed with an end segment 746, which is in turn connected to the first rim segment 740.

The hinge 18, tray 16 and frame 15 are formed as a single, integral and continuous piece both during and after assembly of the insert 14. Specifically, the hinge 18 is integrally formed with a convex curved portion 732 that is disposed adjacent the convexly-curved arcuate segment 744 of the inner rim 742. This configuration gives the area of the frame 15 adjacent the rim segment 740 a hooked shape for restricting the extent to which the tray 16 may pivot away from the tray 115, and also defines a cavity within which the hinge 18 may pivot when the tray 16 is moved away from the inner rim 742.

The insert 14 also includes a spring locking mechanism 752 including a spring 754. One end of the spring 754 is connected to the reinforcing rim 722 at a first end 731, and an opposite end of the spring 754 is connected to the reinforcing rim 722 at the second end 733 adjacent to the convex curved portion 732. A latch 760 is disposed on the spring 754 and extends inwardly toward the center of the well 17. When in an unlocked position such as that shown in FIG. 7, the spring 754 is bowed outwardly away from the insert 14 to allow access to the tray 16. To place the locking mechanism 752 in a locked position, pressure is applied to the spring 754, which causes the spring 754 to bow inwardly so that the latch 760 is disposed above the outer edge of a disc positioned in the well 17 and cooperates with the disk keeper 730 to retain the disc within the well 17.

Means may be provided for keeping the tray 16 aligned in-plane with the frame 15 and in a closed position. For example, the illustrated tray 16 includes a side tab 770 which projects from the outer rim 720 near the disc keeper 730. When the tray 16 is closed, the side tab 770 is received between spaced-apart fingers 772 which project from the inner rim 742 of the frame 15. The illustrated tray 16 also includes an end tab 774 which projects from the first end 731 thereof. When the tray 16 is closed, the end tab 774 is received between spaced-apart fingers 776 which project from the inner rim 742 of the frame 15. The end tab 774 also includes a recess 778 that engages a complementary projection 780 of the frame to resist unintentional opening of the tray 16. These features are particularly useful in keeping the tray 16 in a closed position and aligned with the frame 15 during assembly of the insert to the folder 12.

The frame 15 optionally includes one or integrally-molded raised bosses 782 having hooks 784 projecting therefrom. These hooks 784 may be used in attaching the insert 14 to a folder.

For example, FIG. 8A illustrates a folder 812 similar in construction to folder 12 described above and including first, second, third, and fourth panels 836, 838, 840, and 842, respectively. The first panel 836 is shown folded over the second panel 838 and bonded thereto. Upper and lower glue tabs 868 and 870 are connected to the third panel 840 by upper and lower spines 822 and 824, respectively. A side glue tab 872, which is shown folded over and bonded to the fourth panel 842, extends from a side hinge 862. A notch 830 is formed in the side glue tab 872 and the fourth panel 842.

The upper and lower glue tabs 868 and 870 each have an opening 876 formed therein which receives the hook 784 and a portion of the boss 782 of the insert 14. In FIG. 8A, the upper glue flap 868 is in a flat position while the lower glue flap 870 is folded down against the insert 14.

As shown in FIG. 8B, the bosses 782 and hooks 784 are sized and positioned such that, when the glue flaps 868 and 870 are folded down over the insert 14, the hooks 784 will engage the openings 876 and hold the glue flaps 868 and 870 down against the insert 14. With both the upper and lower glue flaps 868 and 870 folded down, they insert 14 is retained in the proper position and orientation against the folder 812 and the glue flaps 868 and 870 are ready to have the fourth panel 842 folded over and bonded to them. This configuration may be readily assembled in an automated or semi-automated fashion with a minimum of process steps and complications.

Figure 9:
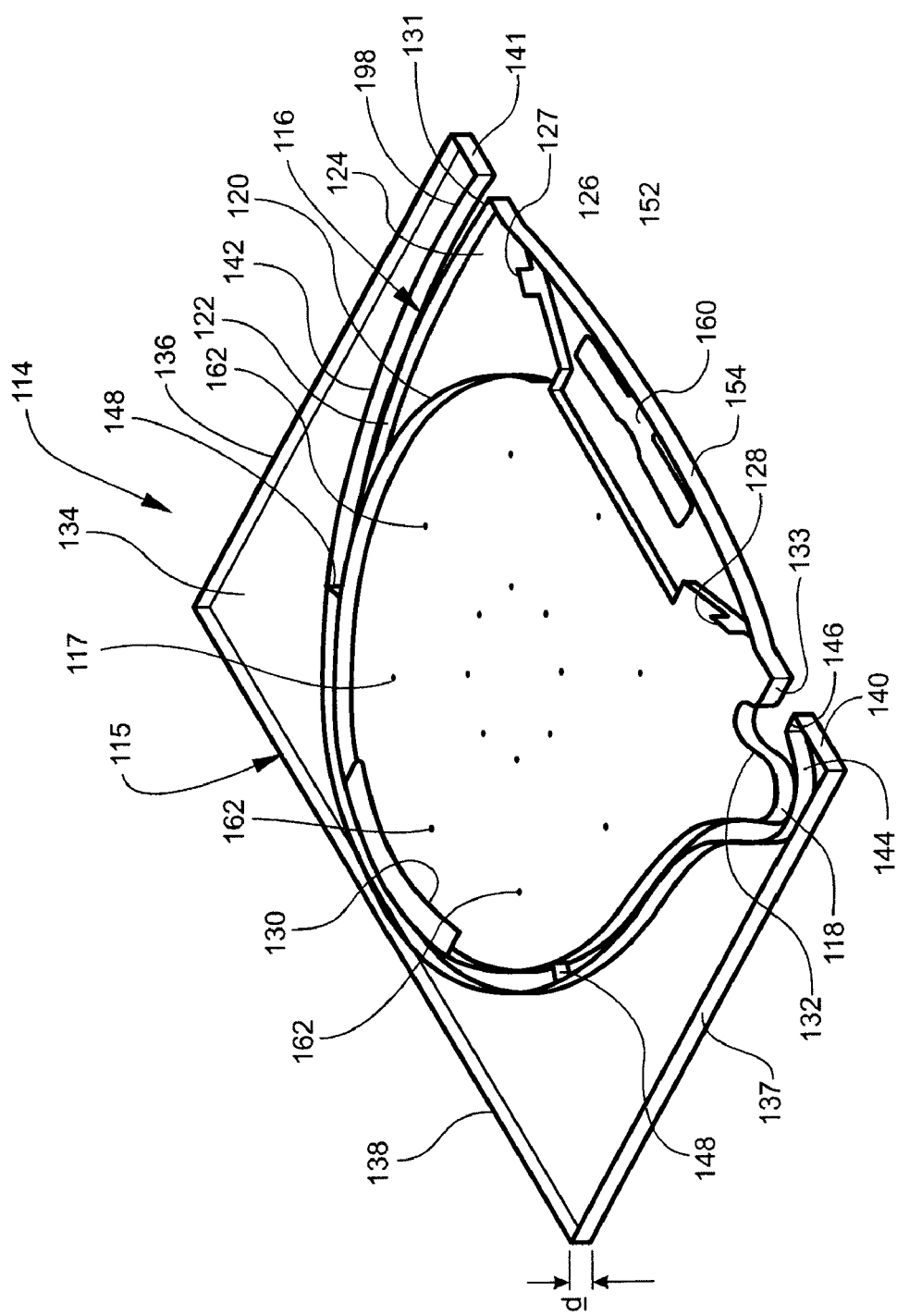
FIG. 9 is a perspective view of an alternative insert.

A disc insert according to another embodiment of the invention is shown generally at 114 in FIG. 9. The insert 114 includes an integrally formed frame 115 and tray 116. A hinge 118 is likewise integrally formed with the frame 115 and tray 116, and operates to allow pivotal movement of the tray 116 relative to the frame 115. The tray 116 includes a reinforcing rim 120. An outer rim 122 extends from the reinforcing rim 120 to define a disc well 117 and a support floor 124 that both extend to a side edge 126.

Two tabs 127, 128 extend from the side edge 126 at angles generally perpendicular to the well 117 and floor 124. The tabs 127, 128 engage the fourth panel 42 when a folder 12 of the invention is wrapped around the insert 114 to provide additional rigidity to an assembled package and prevent the folder 12 from collapsing into the well 117 and damaging a disc. The well 117 is further protected by a disc keeper 130, which is disposed on the outer rim 122 and extends inwardly over the well 117 for maintaining a disc in place within the well 117.

Although the insert 114 may be utilized with any suitable storage folder or container, the insert 114 is preferably wrapped within the folder 12 in a manner identical to that described above with respect to FIGS. 3 through 7. Furthermore, while the tray 116 may have any suitable shape, the tray 116 preferably has a generally tear drop, or pear shape defined by the outer rim 122, which extends from a first end 131 of the tray 116 through a sinuous, S-shaped curve 132 that terminates at a second end 133.

Figure 10:
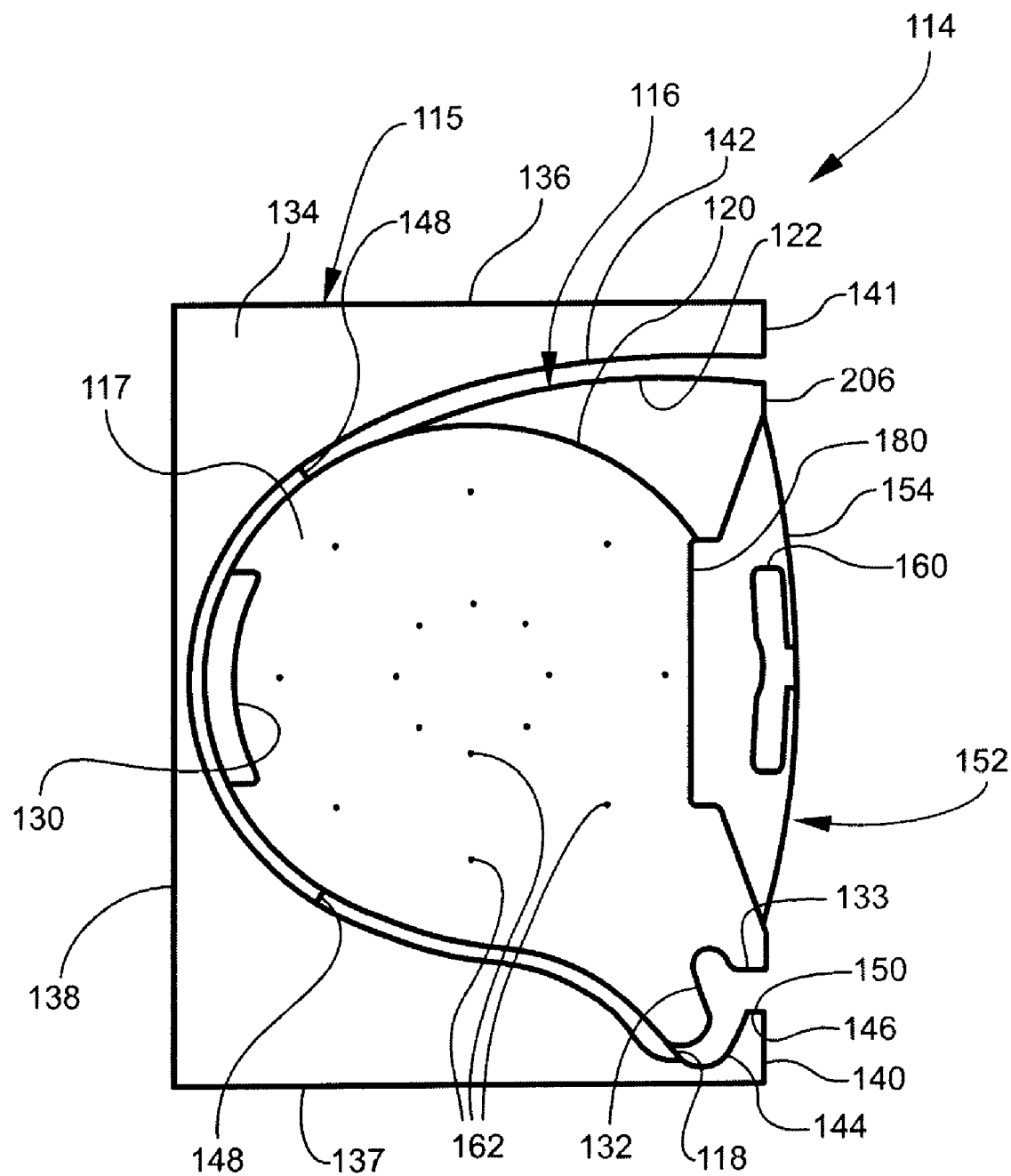
FIG. 10 is a top plan view of the insert of FIG. 9.

Referring now to FIG. 10, the frame 115 has a floor 134 from which a pair of opposed lateral rims 136, 137, a transverse side rim 138 and outer rim segments 140, 141 extend. An inner rim 142 having a curved shape generally complimentary to that of the outer rim 122 extends from the rim segment 140 to the rim segment 141. The inner rim 142 includes an arcuate segment 144 formed with an end segment 146, which is in turn connected to the first rim segment 140.

The inner and outer rims 142, 122 are interconnected by two breakaway tabs 148. The tabs 148 maintain the tray 116 in a fixed position relative to the frame 115, but are designed to break in response to a force applied to the tray 116 during assembly. Breaking the tabs 148 permits the hinge 118 to pivot and the tray 116 to move away from the frame 115 in a manner like that illustrated in FIG. 2.

The hinge 118, tray 116 and frame 115 are formed as a single, integral and continuous piece both during and after assembly of the insert 114. Specifically, the hinge 118 is integrally formed with the S-shaped curve 132 and the arcuate segment 144, which not only gives the area of the frame 115 adjacent the rim segment 140 a hooked shape for restricting the extent to which the tray 116 may actually pivot away from the tray 115, but also defines a cavity 150 within which the hinge 118 may pivot when the tray 116 is moved away from the inner rim 142.

The insert 114 also includes a spring locking mechanism 152 including a spring 154. One end 156 of the spring 154 is connected to the outer rim 120, and an opposite end 158 is connected to the outer rim 120 at the second end 133 adjacent to the S-shaped curve 132. A latch 160 is disposed on the spring 154 and extends inwardly toward the center of the well 117. When in an unlocked position such as that shown in FIG. 10, the spring 154 is bowed outwardly away from the insert 114 to allow access to the tray 116. To place the locking mechanism 152 in a locked position, pressure is applied to the spring 154, which causes the spring 154 to bow inwardly so that the latch 160 is disposed above the outer edge of a disc "D" positioned in the well 117 and cooperates with the disk keeper 130 to retain the disc "D" within the well 117.

A disc stored in the insert 114 is further protected by raised bumps 162 which are spaced apart on the disc well 117. The bumps 162 may have any suitable shape and dimensions, be formed in any number, and be positioned at any locations on the well 117; however, each bump 162 preferably has a conical shape or alternatively, any other rounded shape, and measures about 0.762 mm (0.030 in.) by 0.2 mm (0.008 in.). The bumps 162 engage the non-media portion of a disc positioned in the well 117 to eliminate any contact between the components of the insert 114 and the media-containing portions of the disc.

Although the spring locking mechanism 152 shown in FIGS. 9 and 10 is configured to move between locked and unlocked positions in response to manual pressure on the latch 160, the spring locking mechanism 152 may alternatively be configured to automatically unlock when the cover 32 on a folder 12 is opened, and then automatically relock in response to the cover 32 being closed.

Figure 11:
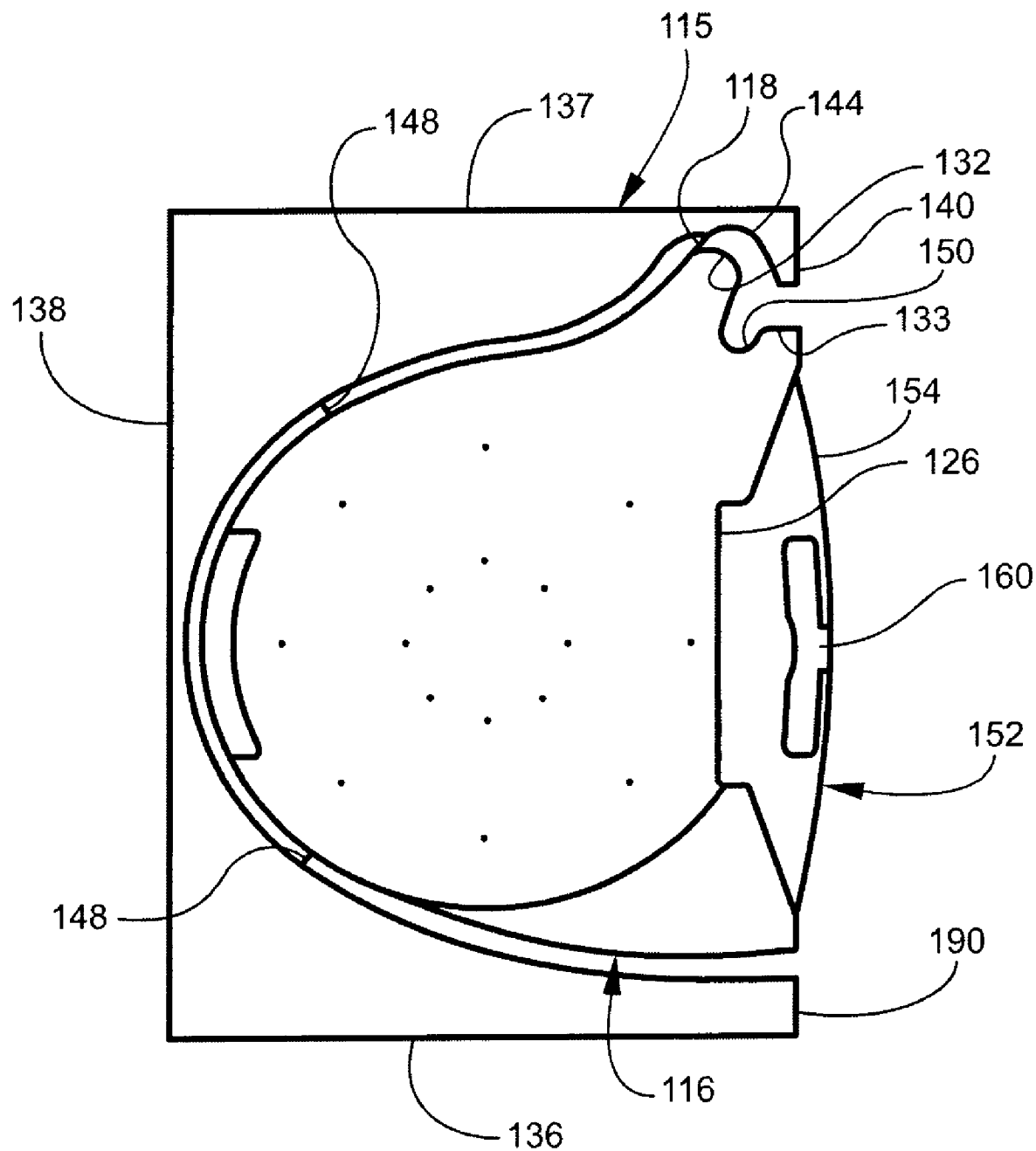
FIG. 11 is a bottom plan view of the insert of FIG. 9.
Figure 12:
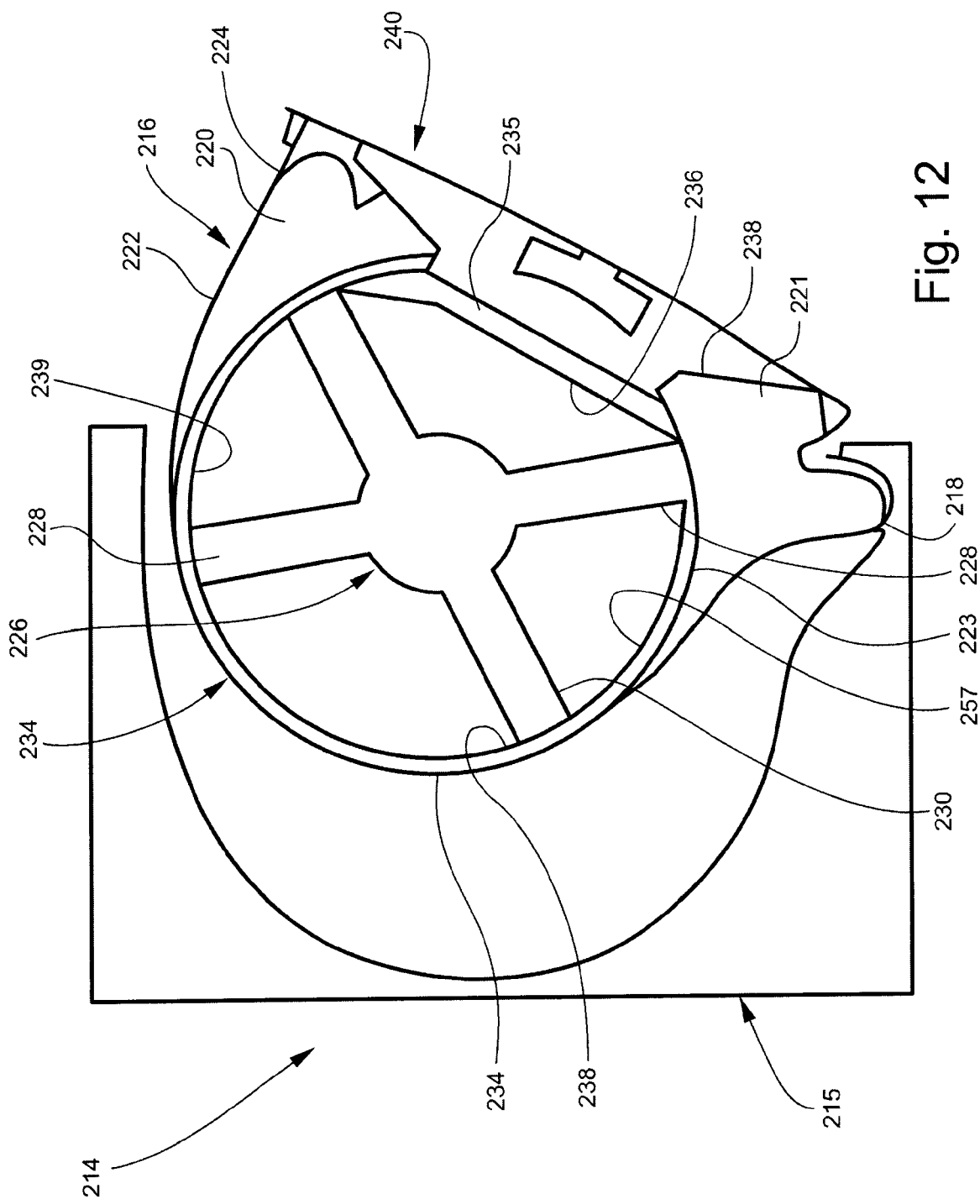
FIG. 12 is a top plan view of an alternative insert.

An insert according to another embodiment of the invention is shown generally at reference numeral 214 in FIG. 12. With the exception of the manner in which the disc well 217 is formed, the insert 214 is identical to the insert 114 shown in FIGS. 9 through 11. In particular, the insert 214 has a tray 216, frame 215, and hinge 218 which have structures and functions identical to like elements of the insert 114 shown in FIGS. 8 through 10.

The insert 214 differs from the insert 114 in that the insert 214 does not include a solid, continuous floor, but instead features first and second floor portions 220, 221 disposed between respective reinforcing rims 222, 223 and an outer rim 224. A generally X-shaped seat 226 is defined by first and second intersecting ribs 228, 230, a central support 232 and a C-shaped disc rim 234, which is formed from the reinforcing rims 222, 223 and a segment of the outer rim 224. The ends of the C-shaped disc rim 234 are interconnected by a support rib 235.

The central support 232 is disposed at the intersection of the ribs 228, 230 such that the ends of the first and second ribs 228, 230 radiate outwardly from the central support 232 and are integrally formed with the disc rim 234 to define spaced openings, 236, 237, 238, 239. The X-shaped seat 226 and openings 236, 237, 238, 239 not only reduce the weight of the insert 214 without compromising the structural integrity of the invention, but also result in substantial cost savings in the materials used to form the insert 214.

Figure 12A:
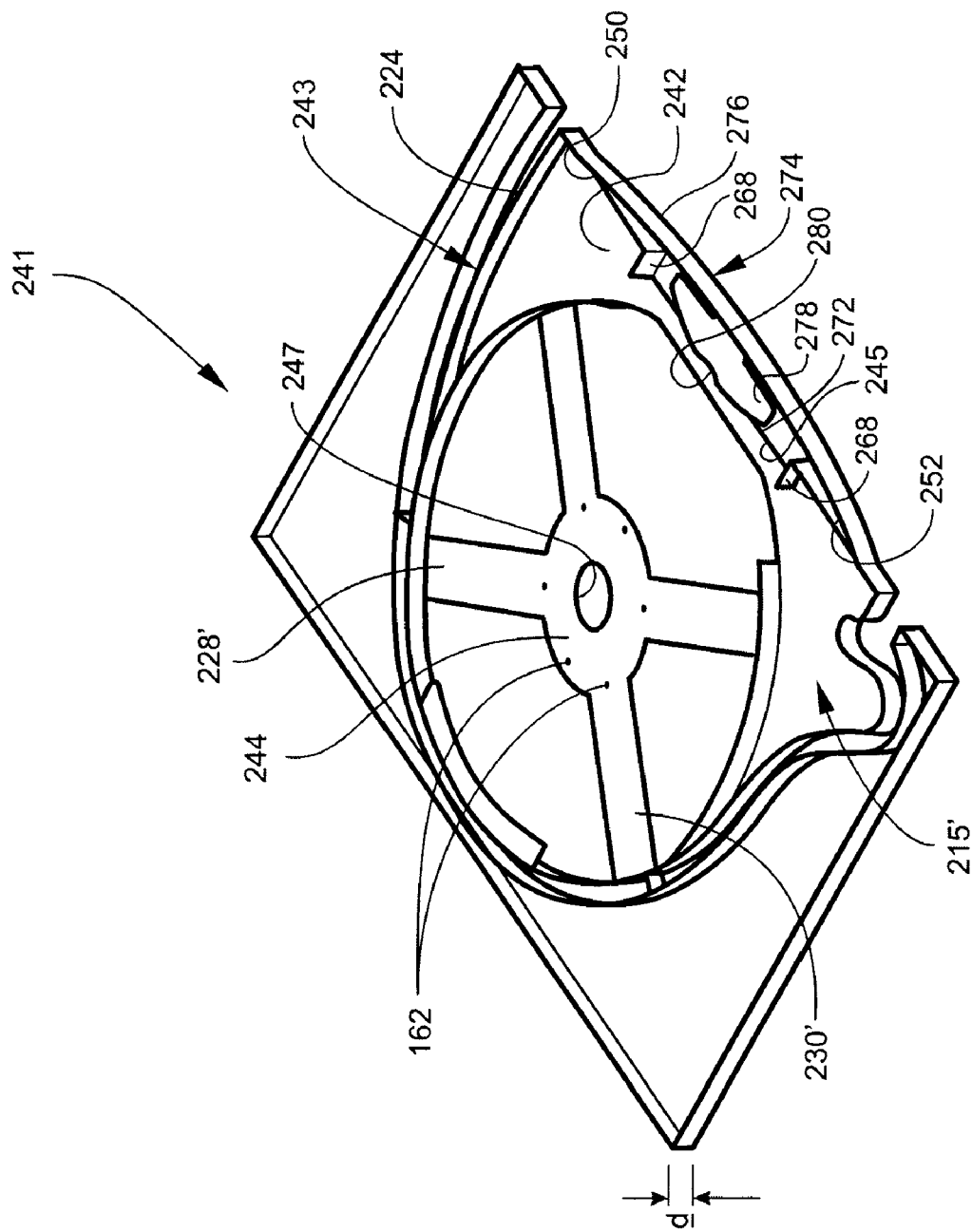
FIG. 12A is a perspective view of another alternative insert.

The insert 214 also includes two breakaway tabs (not shown) and a spring locking mechanism 240, which have the same components and the same general features as the tabs 148 and locking mechanism 152 of the insert 114. FIG. 12A shows the insert 214 after the tabs have been broken, with the hinge 218 pivoting the tray 216 away from the frame 215 in a manner like that described above with reference to FIGS. 9 through 12. Although the inserts 114 and 214 are each shown with two tabs, any number of tabs may be used.

An insert according to another embodiment of the invention is shown generally at 241 in FIG. 12A. With the exception of modifications to the tray, the disc keeper, and the spring locking mechanism, the insert 240 includes the same components and is formed from the same materials as the insert 214.

The insert 241 has a tray 243 which lacks the support rib 236 and the floor portions 220, 222 of the insert 214. The tray 243 instead has a single floor portion 242 that extends to an interior edge 245. A central support 244 is disposed at the intersection of the first and second ribs 228', 230', and includes an opening 247 sized to receive a finger of an end user to permit the user to grasp the inner edge of a disc and remove the disc from the tray 241. Furthermore, a first rim segment 250 extends from one end of the outer rim 224 of the tray 241, and a second rim segment 252 extends from the opposite end of the outer rim 224' to a respective one of two end rims 268. The interior edge 243 interconnects the end rims 268 to form a rectangular opening 272.

The insert 240 includes a spring locking mechanism 274 which is disposed entirely on the exterior of the tray 215'. Specifically, the locking mechanism 274 has a spring member 276 attached to exterior surfaces of the first and second rim segments 250, 251. The spring member 276 is shown in FIG. 12A bowed outwardly away from the central support 244 in an unlocked position. A latch 278 having a thumb notch 280 is carried by the spring member 276. When the in the unlocked position, the latch 278 overlies the opening 272 and is pulled away from the interior edge 245 to allow a disc to be inserted into the tray 240. The spring locking mechanism 274 is moved to a locked position in the same manner as the spring locking mechanism 152 described above with reference to FIGS. 9 through 11. However, once the mechanism 274 is locked, the spring member 276 is bowed inwardly into the opening 272 with the latch 278 overlying the interior edge 254. When locked, the spring member 276 is also disposed against the first and second rim segments 250, 252 so that the insert 240 will be completely enclosed within the folder 12 when assembled.

The locking mechanism 274 may alternatively be configured to automatically unlock when the cover 32 is opened, and then automatically relock in response to the cover 32 being closed.

The insert 240 also includes raised bumps 162 having a structure and function identical to the bumps 162 disposed on the insert 114.

Although the inserts 114, 214, 241 are designed to hold a maximum of two discs "D", the inserts 114, 214, 241 may alternatively be designed to hold additional discs (for example up to ten discs) by increasing the depth "d" of the opposed lateral rims 136, 137, transverse side rim 138 and outer rim segments 140, 141 by approximately 1.4 mm (0.055 in.) for each additional disc added; however, additions to the depth "d" may vary depending upon the type of disc the final insert is intended to store.

The inserts 114, 214, 241 may also be molded so that the trays are pivoted outwardly away from the frames approximately 1.6 mm (¼ in.), with first and second bars mounted in parallel relation to one another on the tray and frame, respectively, so that the first and second bars interfere with each other when the tray is pivoted back into the frame to effectively "lock" the tray in position.

Referring now to FIGS. 13 through 16, an insert according to another embodiment of the invention is shown generally at reference numeral 314. Unlike the inserts described above, the insert 314 lacks a tray capable of pivoting relative to a frame, but instead consists of a single tray 316 having a floor 320 with first, second, third and fourth floor portions 322, 324, 326, 328 integrally formed together to define first, second, third and fourth corners 330, 332, 334, 336. The floor 320 also includes an X-shaped base 338 consisting of first and second diagonal base members 340, 342. The base members intersect at a central support 344 and opening 345 identical in structure and function to the support 244 and opening 247 of the insert 241. The first base member 340 extends diagonally across the floor 320 from the first corner 330 to the third corner 334, and the second base member 342 extends diagonally from the second corner 332 to the fourth corner 336. Disposing the intersecting first and second base members 340, 342 into the corners 330, 332, 334, 336 in this manner stabilizes the insert 314 by reinforcing the floor portions 322, 324, 326, 328.

Figure 13:
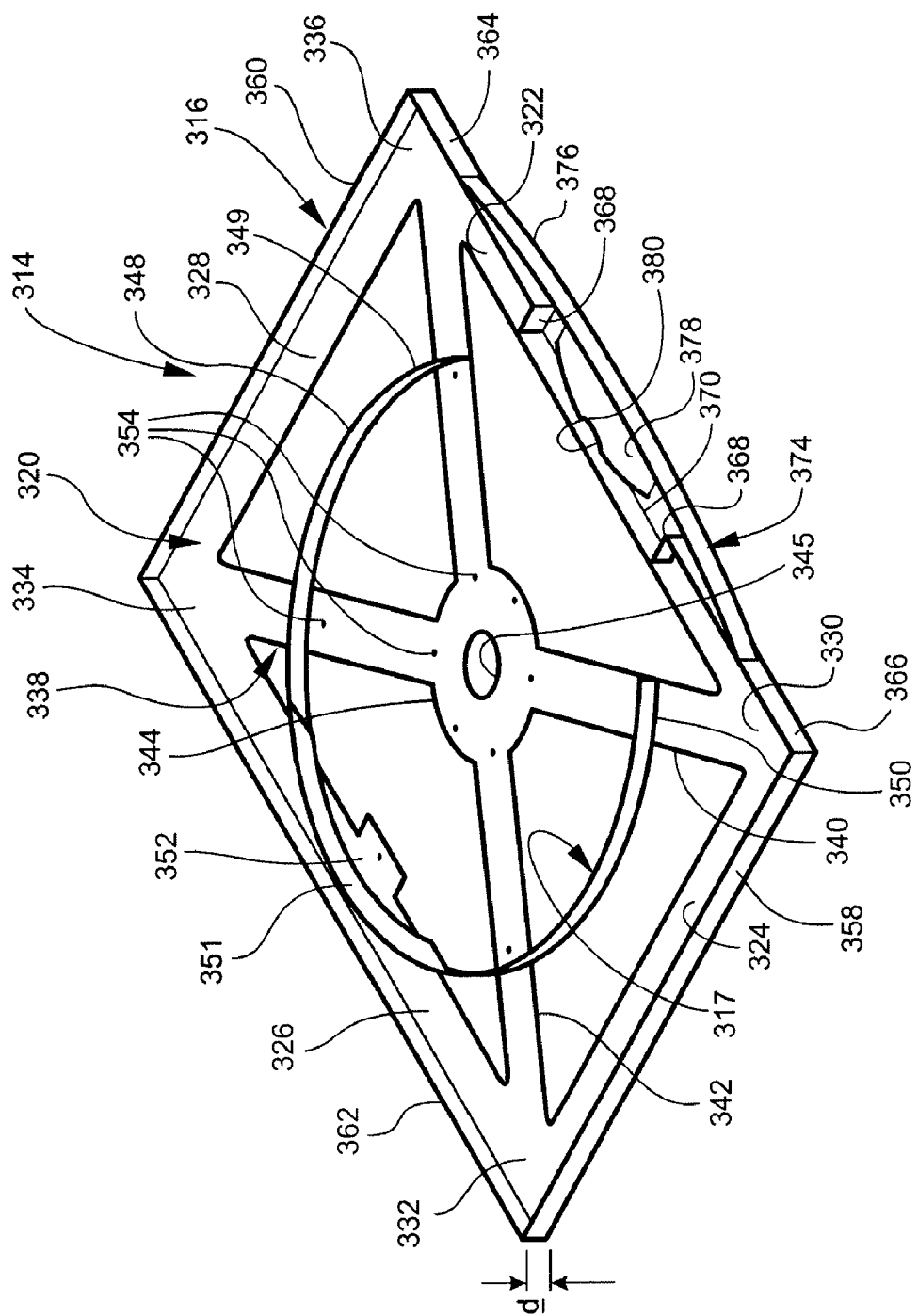
FIG. 13 is a top perspective view of another alternative insert.

The insert 314 also has a disc well defined by a C-shaped rim 348. The rim 348 extends from a first end 349, which is connected to the second base member 342, to a second end 350, which is connected to the first base member 340. As is shown in FIG. 13, a disc keeper 351 extends from the upper edge of the rim 348 radially inwardly toward the central support 344. The keeper 351 overlies a tab 352 that extends inwardly from the third floor portion 326 toward the central support 344. The keeper 351, tab 352 and rim 348 define a compartment within which the outer edge of a disc is placed prior to positioning the disc within the rim 348.

The insert 314 includes raised bumps 354 which are spaced apart on the disc well 317. The bumps 354 have a structure and function identical to the bumps 162 of the insert 114.

Figure 14:
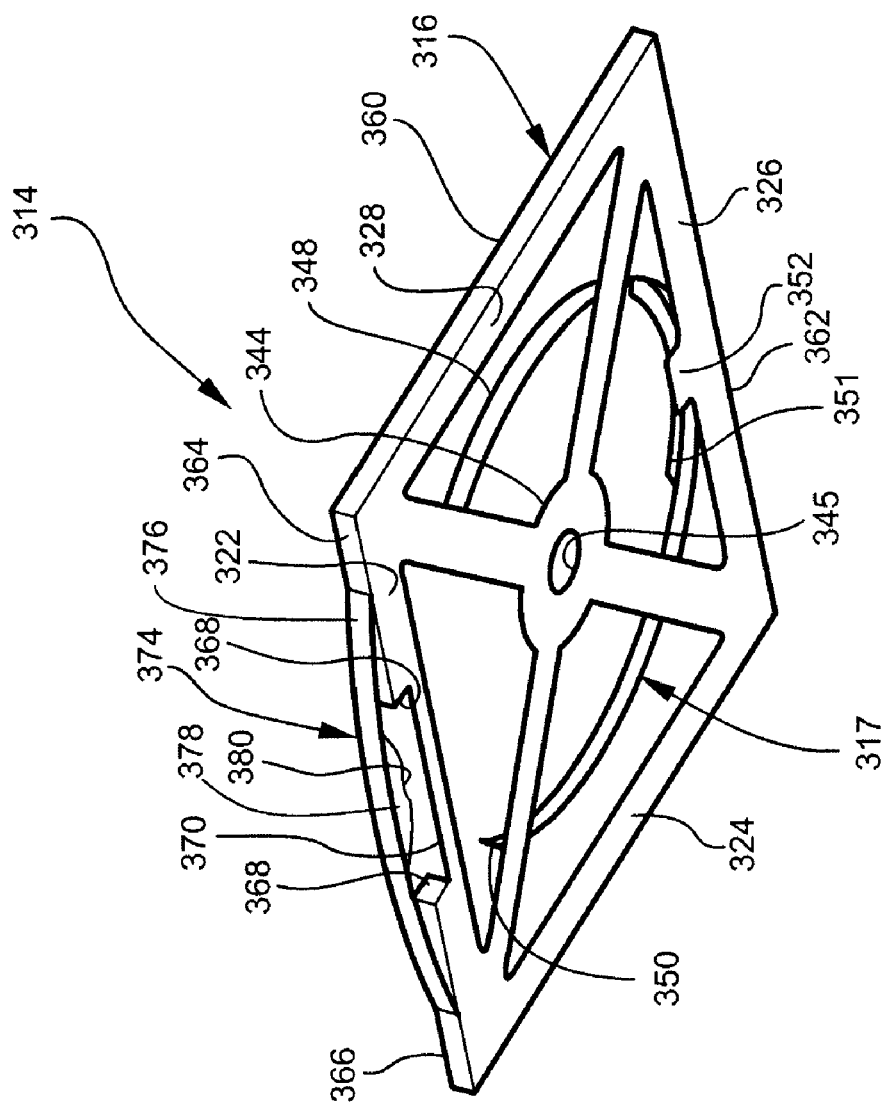
FIG. 14 is a bottom perspective view of the insert of FIG. 13.
Figure 15:
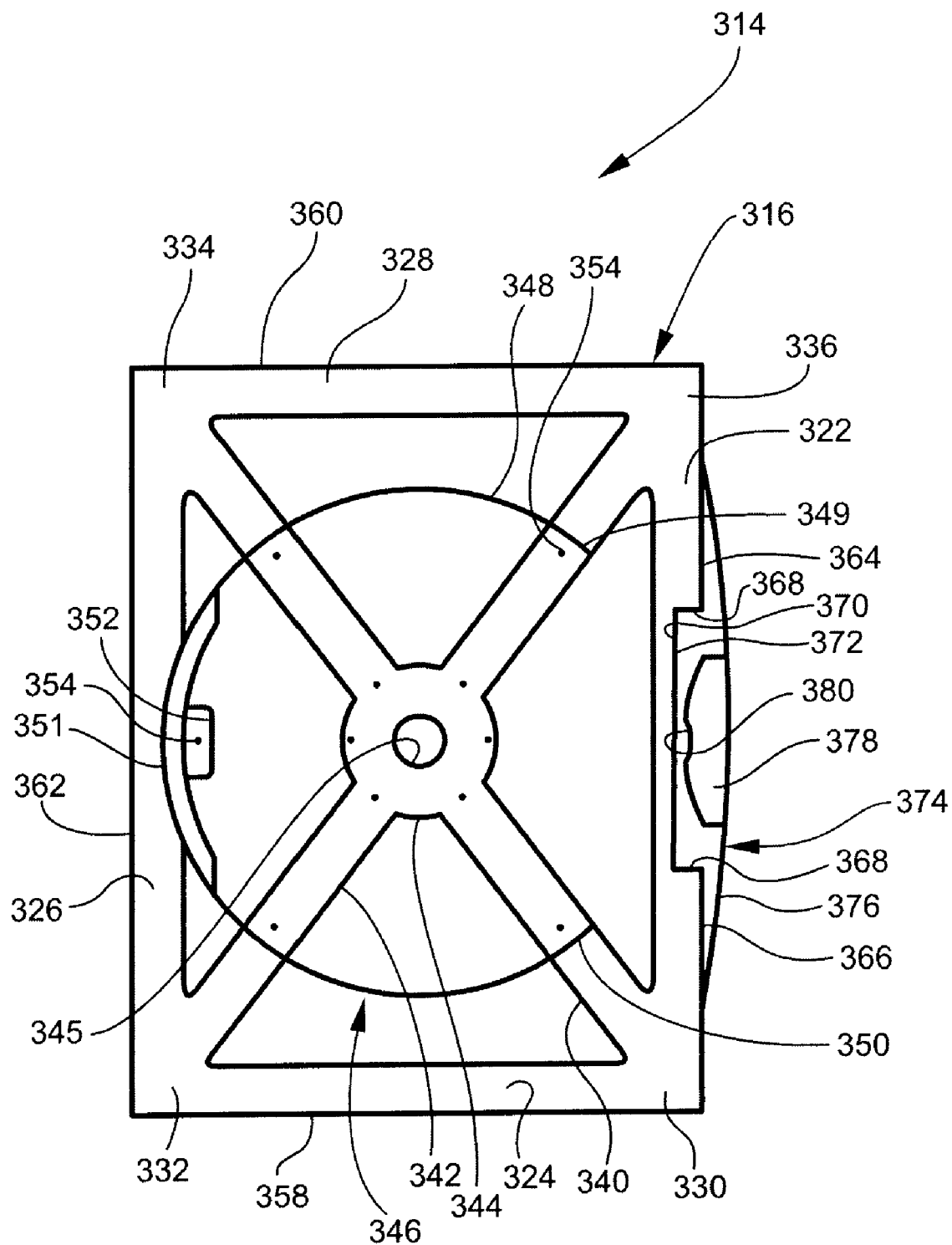
FIG. 15 is a top plan view of the insert of FIG. 13.

The tray 316 also includes an outer wall formed by lower and upper rims 358, 360, a lateral side rim 362, and first and second rim segments 364, 366. As is best shown in FIGS. 14 and 15, the first rim segment 364 extends from the upper rim 360, and the second rim segment 366 extends from the lower rim 358 to a respective one of two end rims 368. An interior edge 370 interconnects the end rims 368 to form a rectangular opening 372 in the first end portion 322.

The insert 314 includes a spring locking mechanism 374 similar in structure and function to the locking mechanism 274; however, the spring member 376 on the insert 314 is attached to first and second rim segments 364, 366 which are in turn connected to the lower and upper rims 358, 360. The mechanism also includes a latch 378 having a shape that differs from the latch 278 and includes thumb notch 380. The spring locking mechanism 374 is moved between unlocked and locked positions relative to the interior edge 370 in the same manner as the spring locking mechanism 274 described above with reference to FIG. 12A moves relative to the interior edge 254.

Although the insert 314 is designed to hold a maximum of two discs "D", the insert 314 may alternatively be designed to hold additional discs (for example ten discs) by increasing the depth "d" of the outer wall by approximately 1.4 mm (0.055 in.) for each additional disc added; however, additions to the depth "d" may vary depending upon the type of disc the final insert is intended to store.

Figure 16:
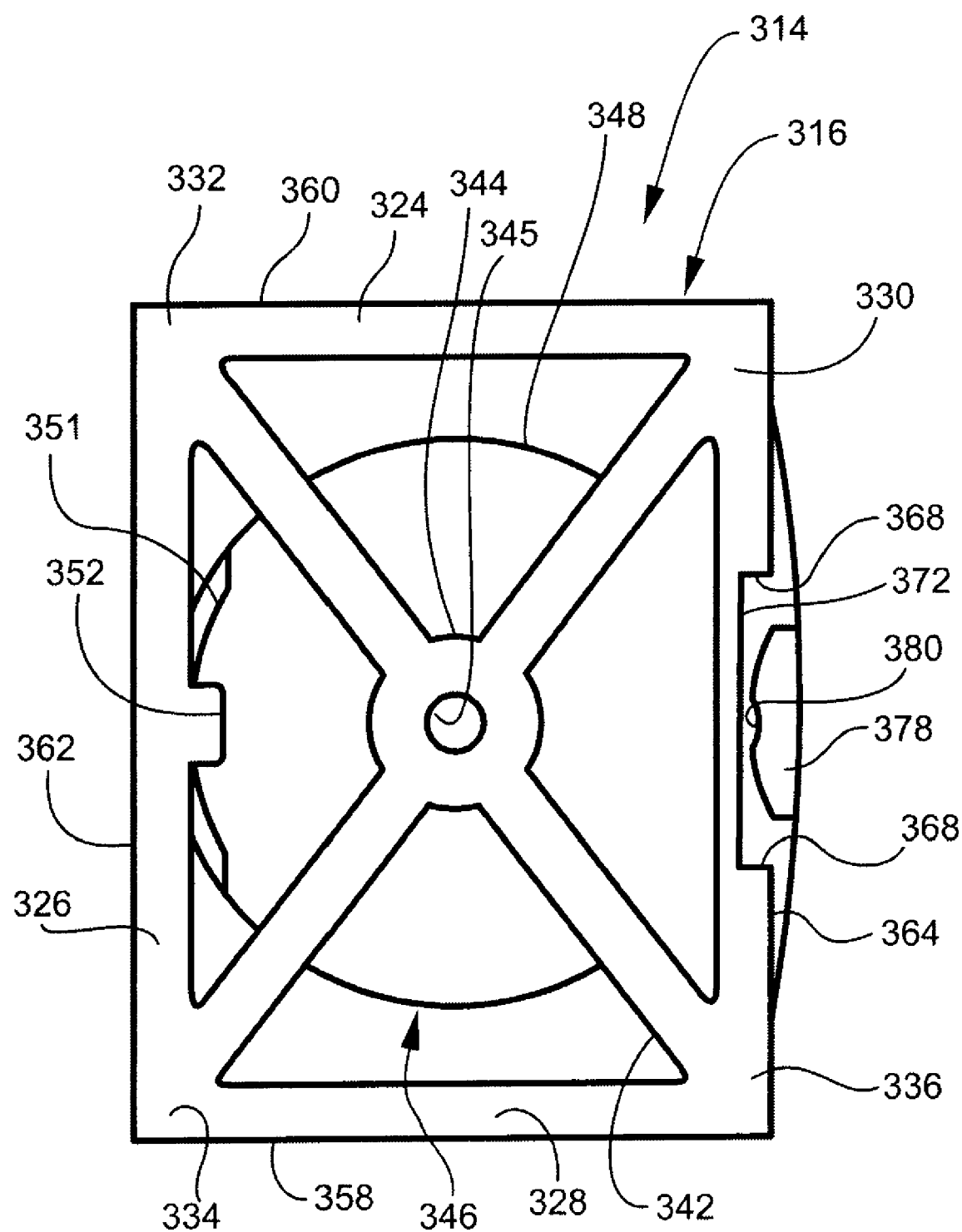
FIG. 16 is a bottom plan view of the insert of FIG. 13.
Figure 16A:
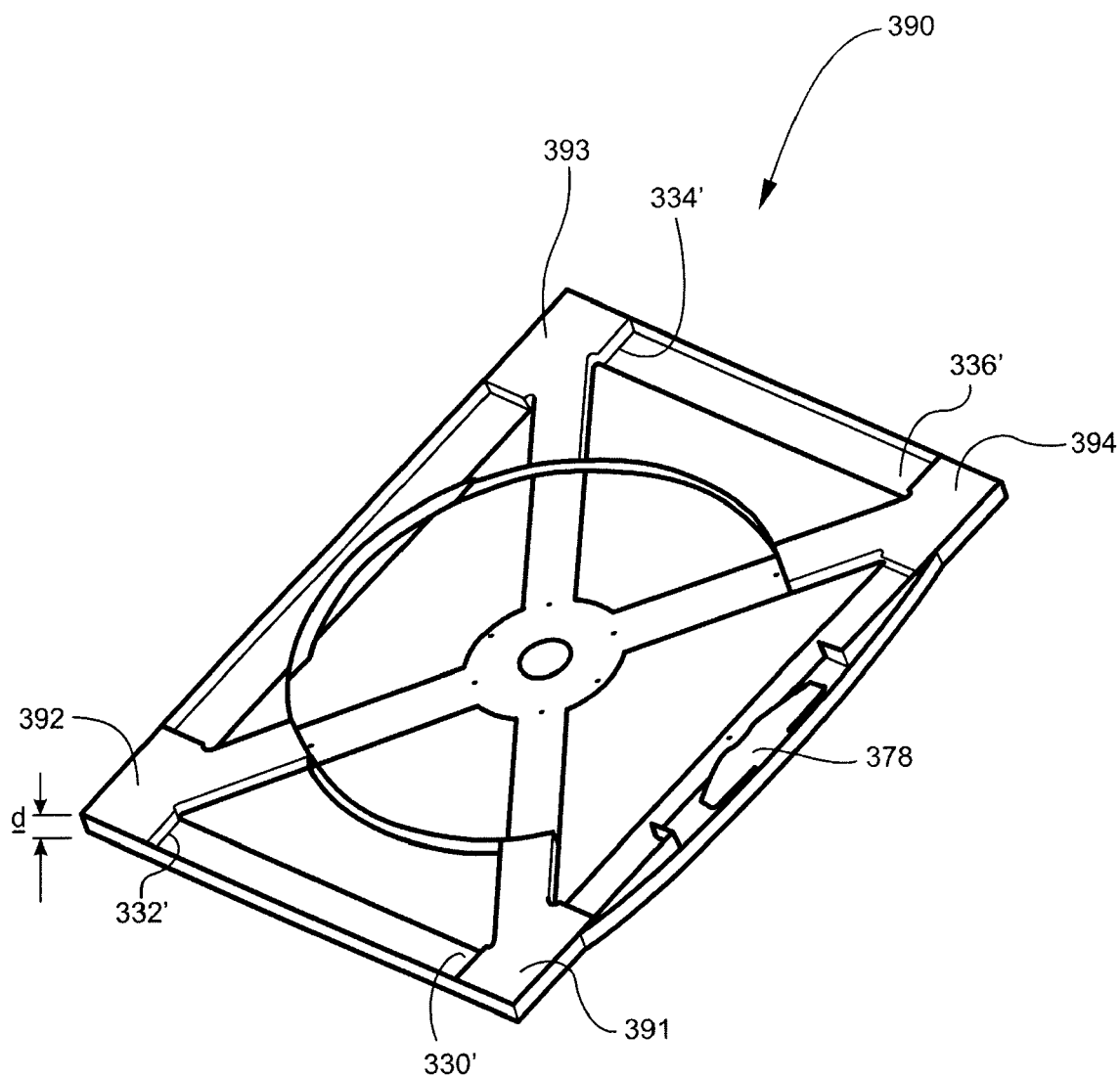
FIG. 16A is a perspective view of another alternative insert.
Figure 16B:
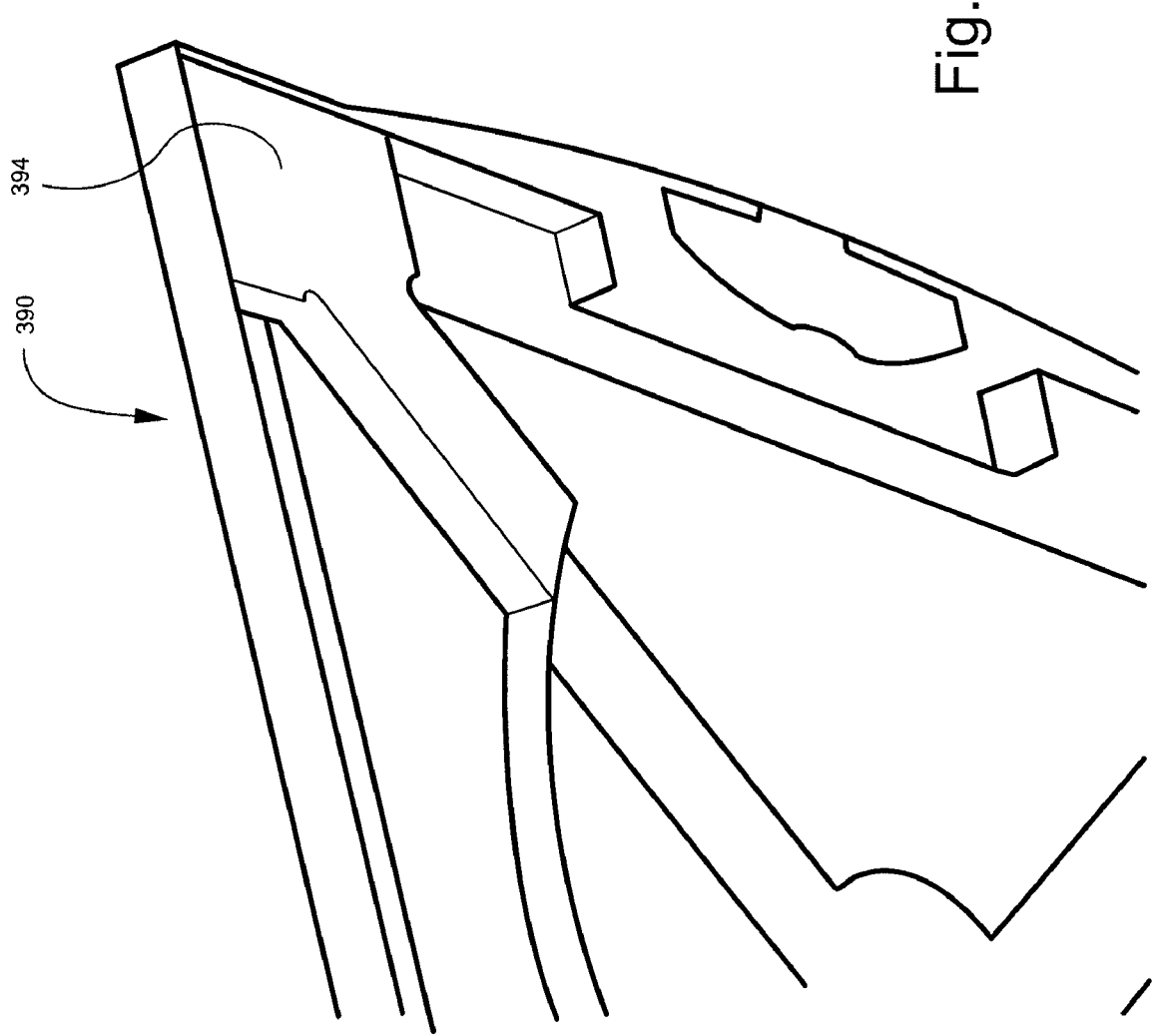
FIG. 16B is an enlarged view of a portion of the insert of FIG. 16A.

An insert according to another embodiment of the invention is shown generally at 390 in FIG. 16A. With the exception of modifications to the tab and corners, the insert 390 includes the same components and is formed from the same materials as the insert 314. As is shown in FIG. 16A, the tab 352 has been removed. The shape of the latch 378 has also been modified. Furthermore, raised segments 391, 392, 393, 394 are formed in the respective corners 330', 332', 334', 336' and extend to the C-shaped rim 348' to provide additional support to the fourth panel of a folder wrapped about the insert 390. A detailed view of raised segment 394 is shown in FIG. 15B.

Figure 17:
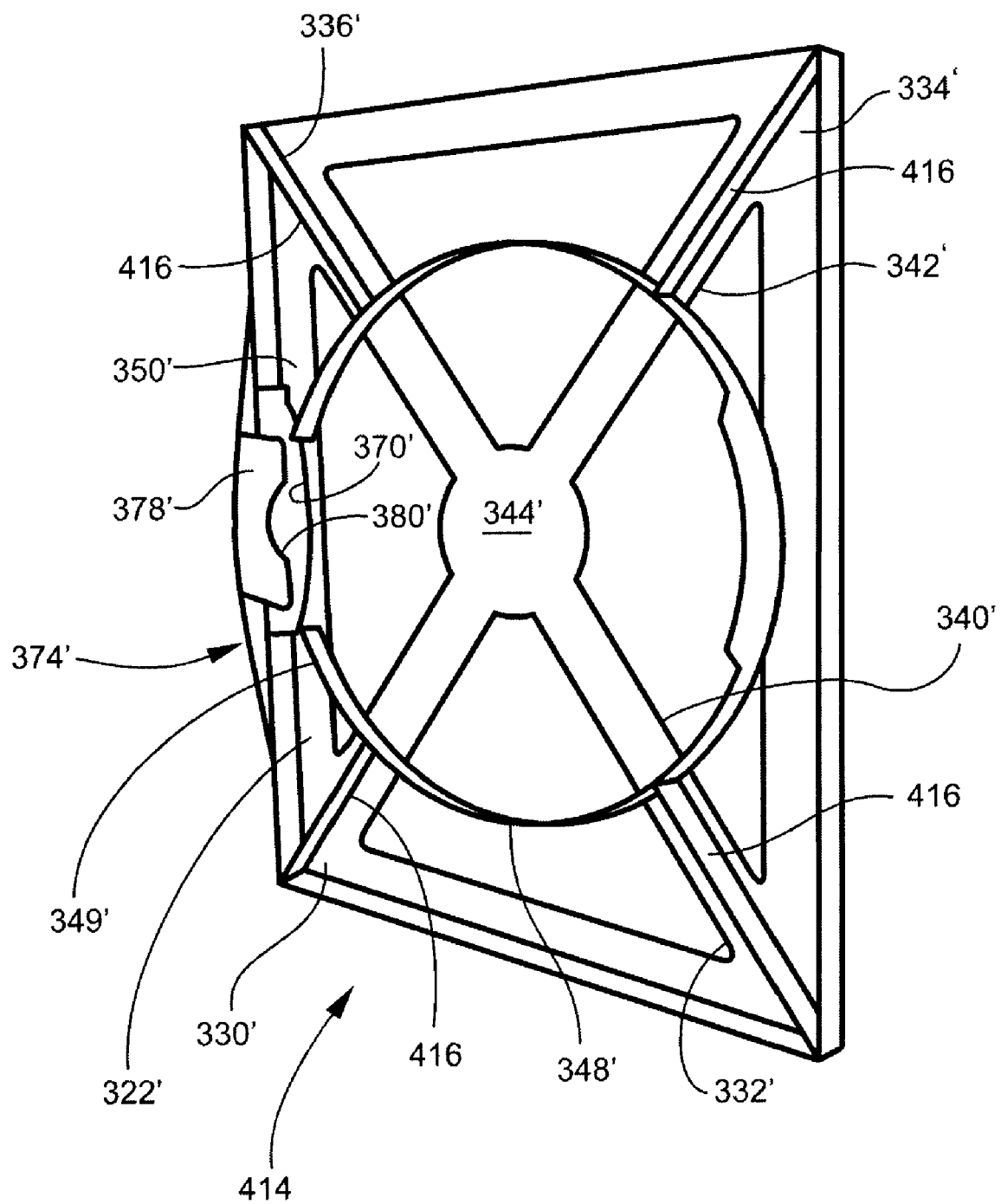
FIG. 17 is a perspective view of another alternative insert.

Referring now to FIG. 17, an insert 414 having components and functions substantially identical to those of the insert 314 has been further modified to include support ribs 416. The ribs 416 are disposed on the first and second base segments 340', 342' to further reinforce the strength and stability of the insert 414. Each of the ribs 416 extends along a selected one of the first or second base segments 340, 342 from one of the corners 330", 332", 334", 336" to the C-shaped rim 348'.

Figure 18:
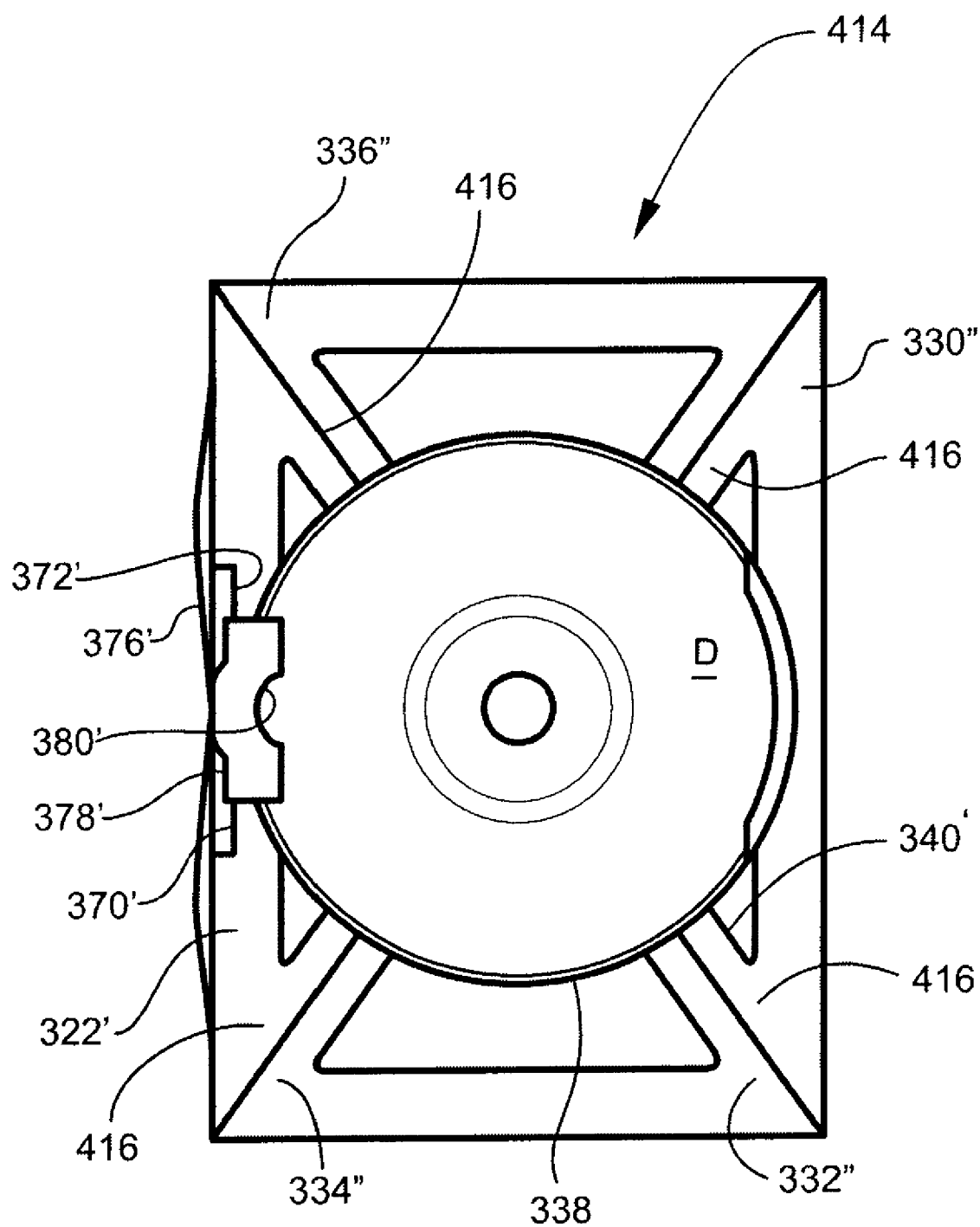
FIG. 18 is a top plan view of the insert of FIG. 17 with a disc placed in a locked position within the insert.

The C-shaped rim 348' of the insert 414 has also been modified so that the first and second ends 349', 350' overlie the respective first and second base segments 340', 342' and are connected to the first floor portion 322'. In addition, the shape of the latch 378' has been modified, the thumb notch 380' enlarged, and the interior edge 370' curved inwardly toward the central support 344' to give an end user more room to manipulate the locking mechanism 374' and remove a disc "D" like that shown in FIG. 18 from the insert 414. The central support shown in FIGS. 17 and 18 may alternatively include an opening and raised bumps like the opening 345 and bumps 354 described above with reference to FIG. 13.

Figure 19:
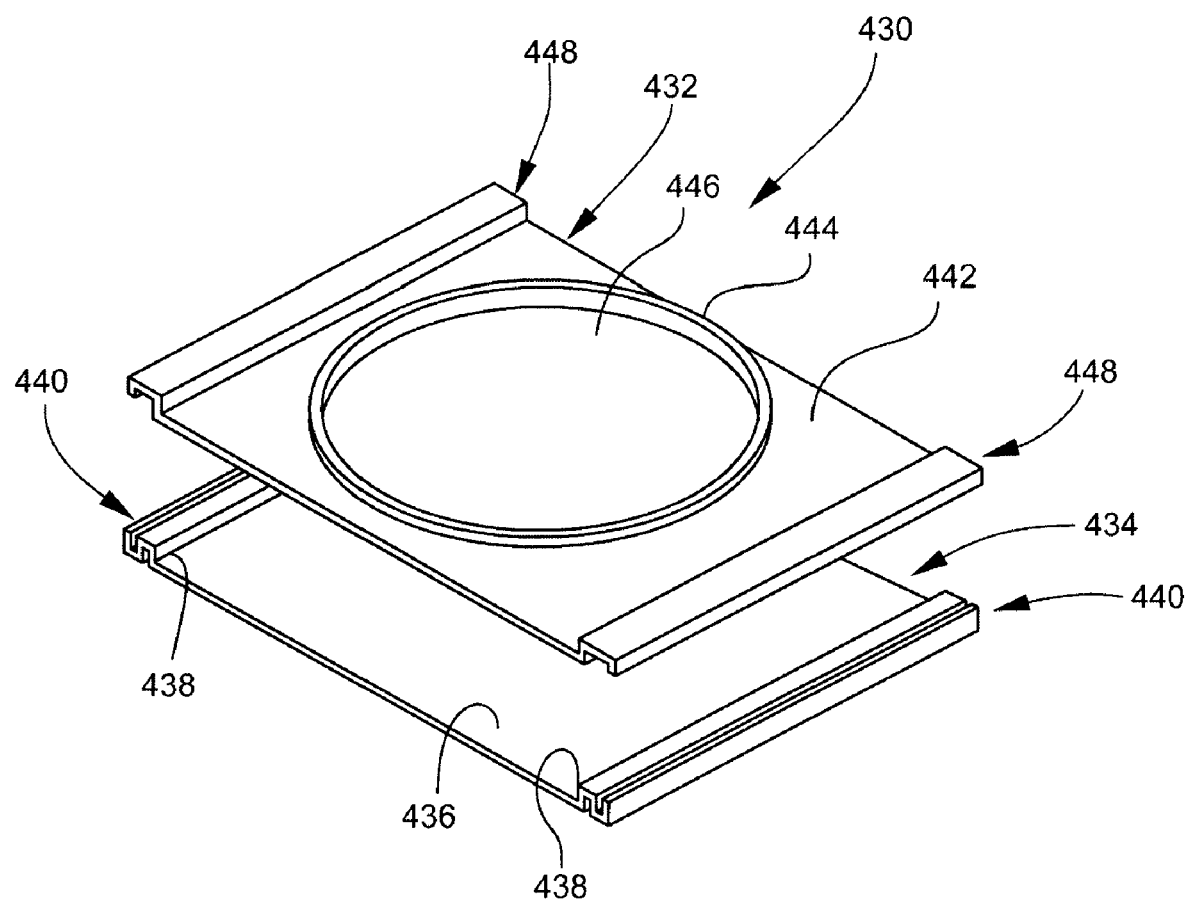
FIG. 19 is an exploded perspective view of another alternative insert.

Referring now to FIG. 19, an insert according to yet another alternative embodiment of the invention is shown generally at 430. In contrast to the inserts 114, 214 and 314, which are each formed from a single injection-molded component, the insert 430 comprises two separately molded components: upper and lower trays 432, 434 which are mated together to permit the trays to slide relative to one another. The lower tray 434 consists of a floor 436 with opposed side edges. Spaced guide members 440 extend parallel to one another along the entire length of the side edges 438. The upper tray 432 includes a floor 442 upon which an annular disc rim 444 is disposed to define a well 446 within which a disc is positioned prior to wrapping the insert 430 in a folder such as the folder 12. Spaced slide rails 448 extend parallel to one another along opposite side edges of the upper tray 432. The slide rails 448 have a shape complementary to that of the guide members 440 to permit the rails 448 to be disposed within and slide relative to the guide members 440.

Figure 20:
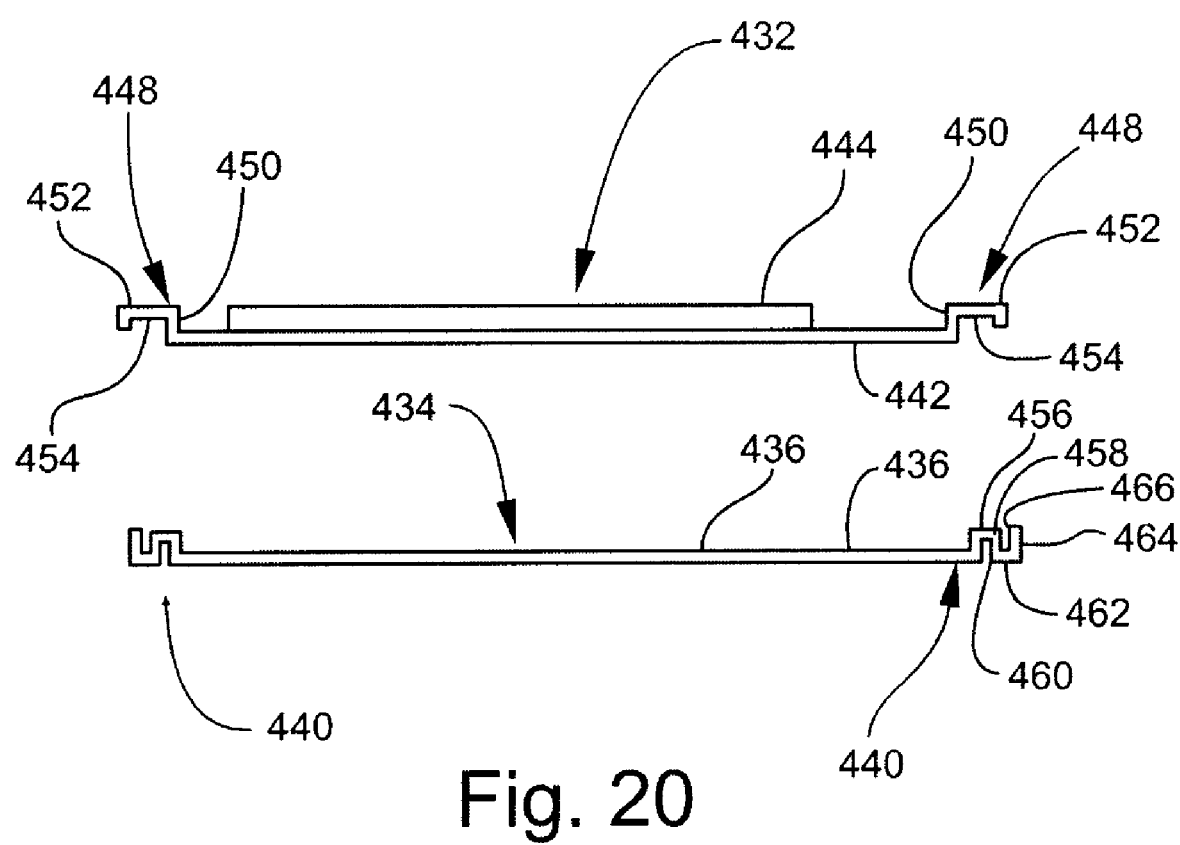
FIG. 20 is a plan view of the front of the insert of FIG. 19.
Figure 21:
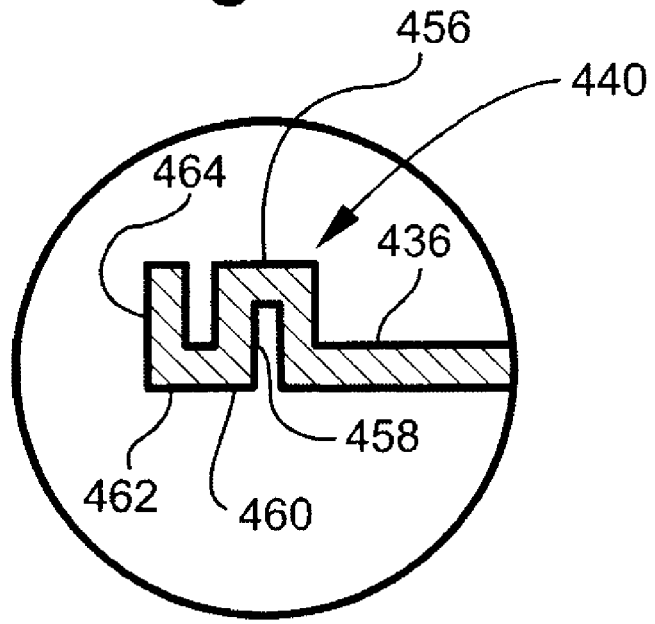
FIG. 21 is a partial view of a lower tray of the insert shown in FIG. 19.

Referring now to FIG. 20, the complementary shapes of the slide rails 448 and guide members 440 also permit the lower surface of the floor 442 of the upper tray 432 to be positioned in closely-conforming relation to the upper surface of the floor 436 of the lower tray 434. In particular, each of the slide rails 448 includes a rim 450 from which a return flange 452 extends to define an upper groove 454. As is best shown in FIG. 21, each of the guide members 440 is formed by an interior flange portion 456 having a tail 458 that extends downwardly toward the floor 436 of the lower tray and terminates along a lower edge 460 which is integrally formed with a return flange 462. The return flange 462 has a tail 464 which is perpendicular to the floor 436 and extends away from the lower edge 460 in a direction opposite and parallel to the tail 458 to define a lower groove 466. The interconnected interior flange portion 456 and return flange 452 give each guide member 440 a generally S-shaped configuration.

Figure 22:
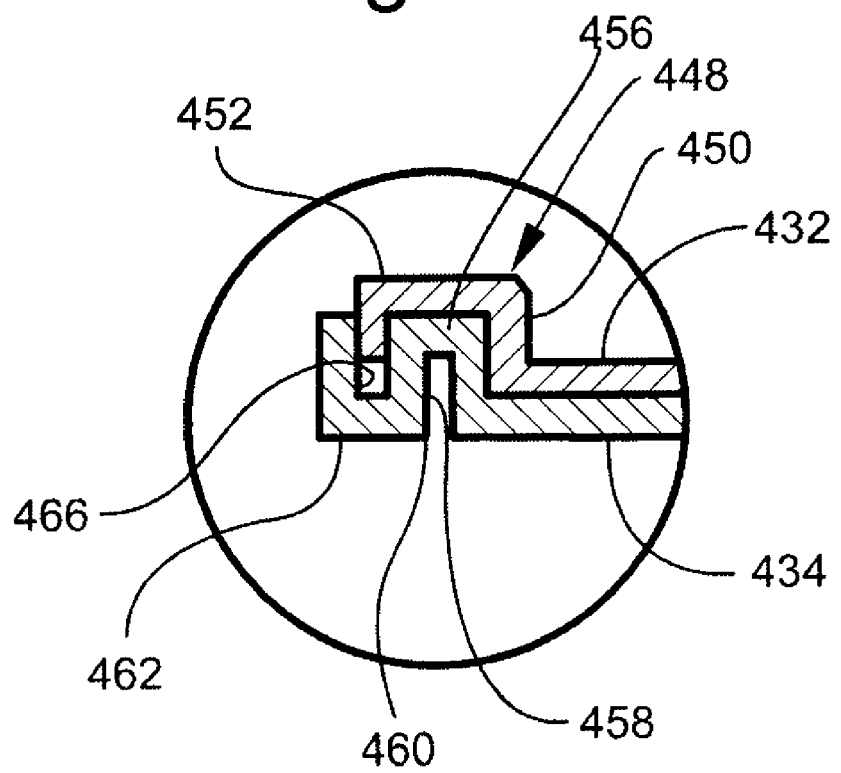
FIG. 22 is a partial cross-sectional view of a side rail and guide member like those which are shown in FIG. 19.

The upper and lower trays 432, 434 are assembled by superimposing the upper tray 432 onto the lower tray 434 in a manner like that shown in FIG. 22. In particular, each return flange 452 of the slide rails 448 is seated over a corresponding interior flange portion 456 of a respective one of the guide members 440 with the tail of the return flange 452 disposed within the lower groove 466 so that the slide rails 448 are aligned with the guide members 440 to permit sliding, translational movement of the upper tray relative to the lower tray.

While the insert 430 may be utilized with any suitable conventional media folder formed from paperboard or another suitable substrate, the insert 430 is preferably utilized with the folder 12. Assembly of the folder 12 around the insert 430 occurs in a manner similar to that which is described above with respect to Figures through 5. The insert 430 is first assembled and loaded with a disc, and is then positioned with the upper tray 432 and disc rim 444 disposed against the fourth panel 42 of the blank 34 so that the two sets of coupled slide rails and guide members extend parallel to the upper and lower pairs of hinges 64, 66. The blank 34 is then wrapped around the insert 430 in a manner identical to that shown in FIGS. 1 and 7, respectively to form a fully assembled storage package.

Figure 23:
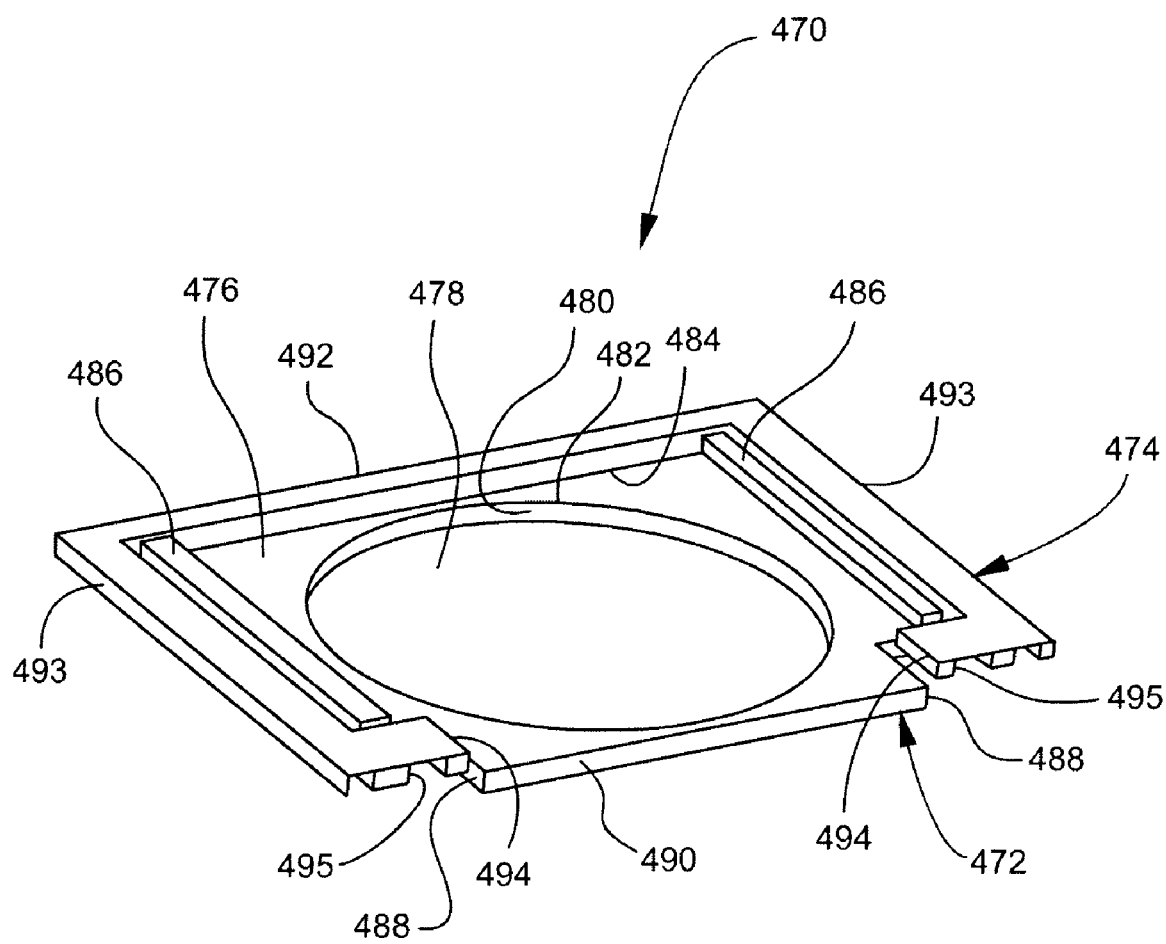
FIG. 23 is a perspective view of an insert according to another embodiment of the invention.

Referring now to FIG. 23, a media storage insert according to yet another alternative embodiment of the invention is shown generally at reference numeral 470. Unlike the two-piece insert 430 described above with reference to FIGS. 19 through 22, the components of the insert 470 are formed together as a single unit during the molding process and are then separated into two components, a tray 472 and frame 474, prior to being wrapped within a folder.

With the exception of sharing the common feature of having components that are capable of sliding movement relative to each other, the tray 472 and frame 474 of the insert 470 differ in structure from the upper and lower trays 432, 434 of the insert 414. As is shown in FIG. 23, the tray 472 has a floor 476 within which a recessed disc well 478 is formed. The well 478 includes an annular wall 480 with an upper edge 482 that is flush with the floor 476 so that the well 478 is embedded completely within the floor 476. The tray 472 also includes a rear edge 484 from which spaced guide rails 486 extend parallel to each other along opposite sides of the tray 490 to respective relief areas 488, which are interconnected by a forward edge segment 490.

Figure 24:
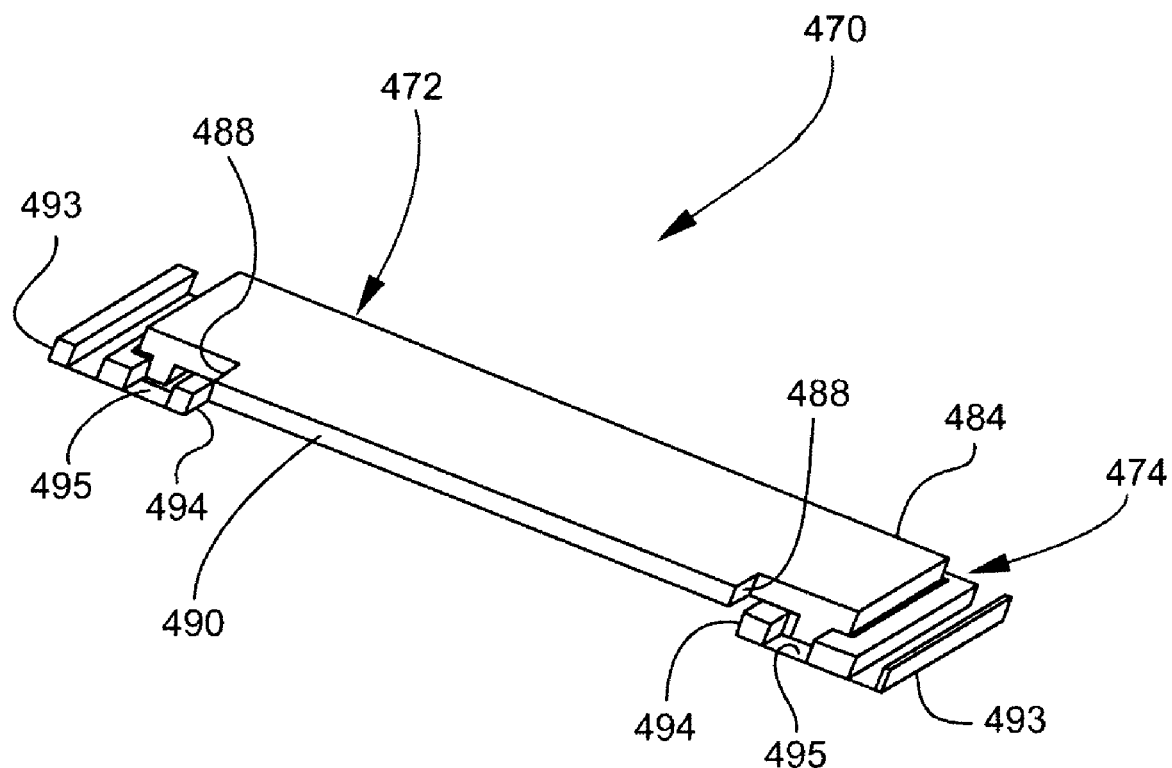
FIG. 24 is a perspective view of a portion of the insert shown in FIG. 23.

The frame 474 has a rear wall 492 from which spaced guide members 493 extend. Each guide member 493 extends parallel and adjacent to a respective one of the guide rails 486 of the tray 472. Inwardly-extending shelf portions 494 are formed at the forward ends of the respective guide members 496. As is best shown in FIG. 24, each shelf portion 494 has a guide channel 495 and is positioned in closely-conforming relation to a respective one of the relief areas 488 so that the guide channels 495 are aligned with the guide rails 486.

Figure 25:
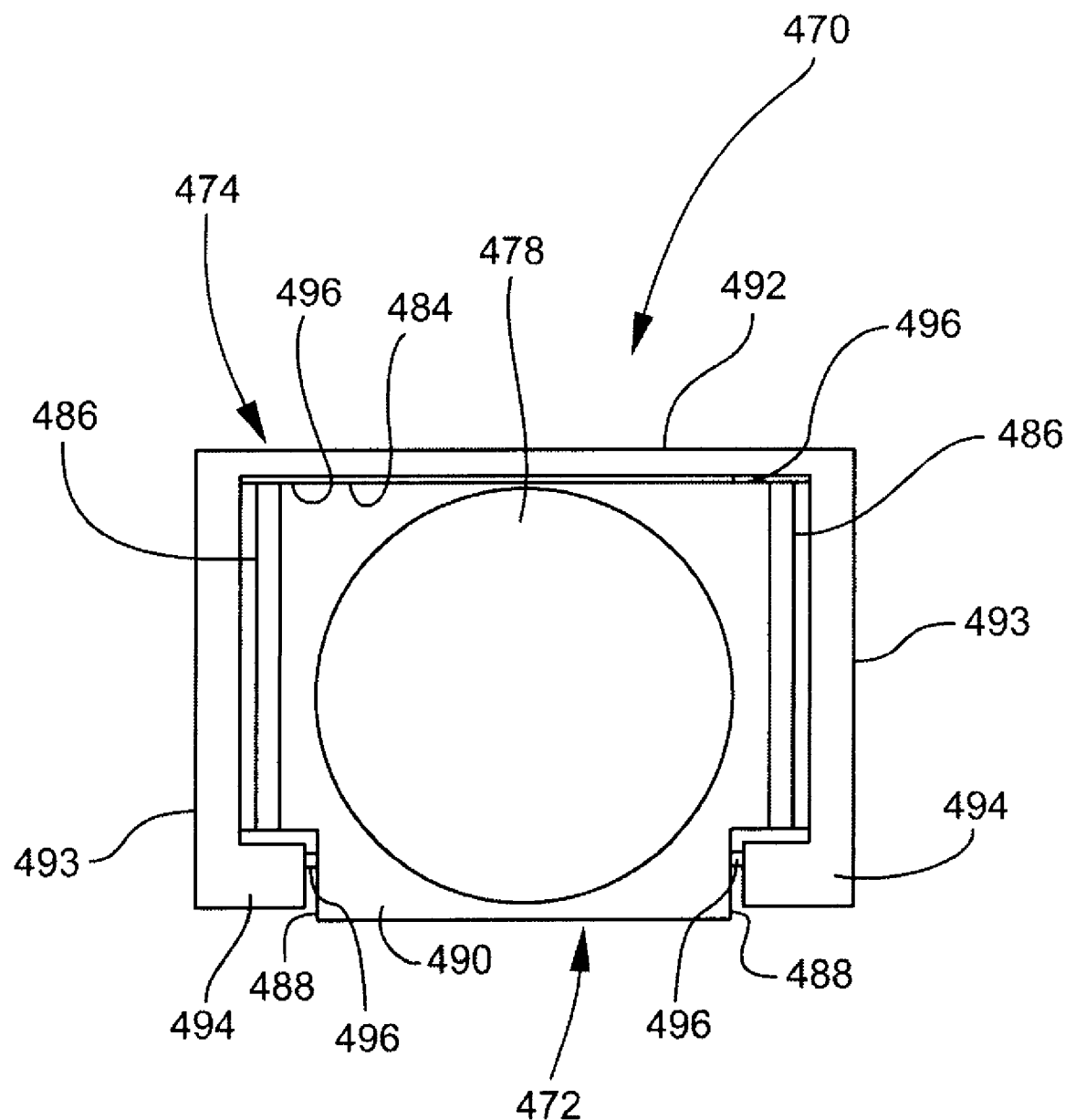
FIG. 25 is a top plan view of the insert shown in FIG. 23.
Figure 26:
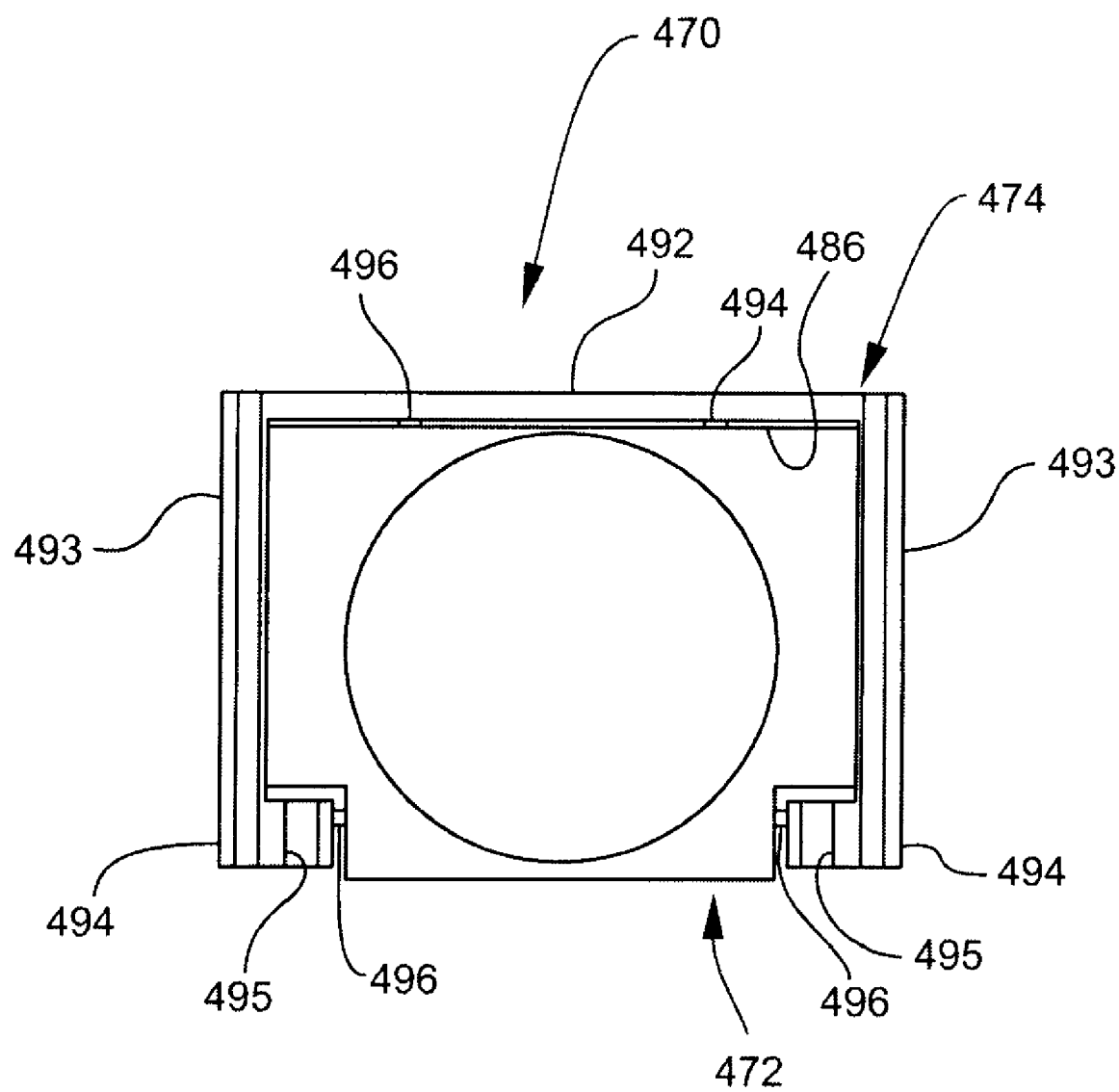
FIG. 26 is a bottom plan view of the insert shown in FIG. 23.

The insert 470 includes four breakaway tabs 496. While the tabs may have any suitable width, each tab 496 is preferably about 6.4 mm (¼ in.) wide. As is best shown in FIGS. 25 and 26, two of the tabs 496 interconnect the rear wall 492 of the frame 474 along the rear edge 454 of the tray 472. The remaining tabs 496 interconnect the shelf portions 494 and the relief areas 488. The tabs 496 are broken in response to a force applied to the insert 470 prior to wrapping the insert 470 within a folder. Breaking the tabs 496 permits the guide rails 484 to side through the guide channels 495 and allow an end user to move the tray 472 away from the frame 474 to access a disc stored in the well 478.

Although the guide members 493 are configured to include the shelf portions 494 and guide channels 495, each of the guide members 493 may alternatively be configured to include an interconnected flange portion and return flange used in the guide members 440 described above with reference to FIG. 19, which would in turn give each guide member 493 a similar S-shaped configuration for cooperating with the guide rails 486 on the tray 472.

The inserts 430, 470 may alternatively be configured to include an X-shaped structure similar that utilized on the base 338 of the insert 314. Furthermore, while the inserts 430 and 470 may be wrapped within any suitable folder, the inserts 430 and 470 are specifically intended for use with a folder similar to the folder 512 described below with reference to FIGS. 27 through 29. However, in contrast to the folder 512, such folder is modified to include an inside spine glue flap which is scored to define a single hinge and then folded and adhesively bonded to the back side of a third panel to form a slip case having a folded, two-ply piece with a thumb notch for permitting an end user to access discs by accessing the sides of the inserts 430, 470.

Figure 27:
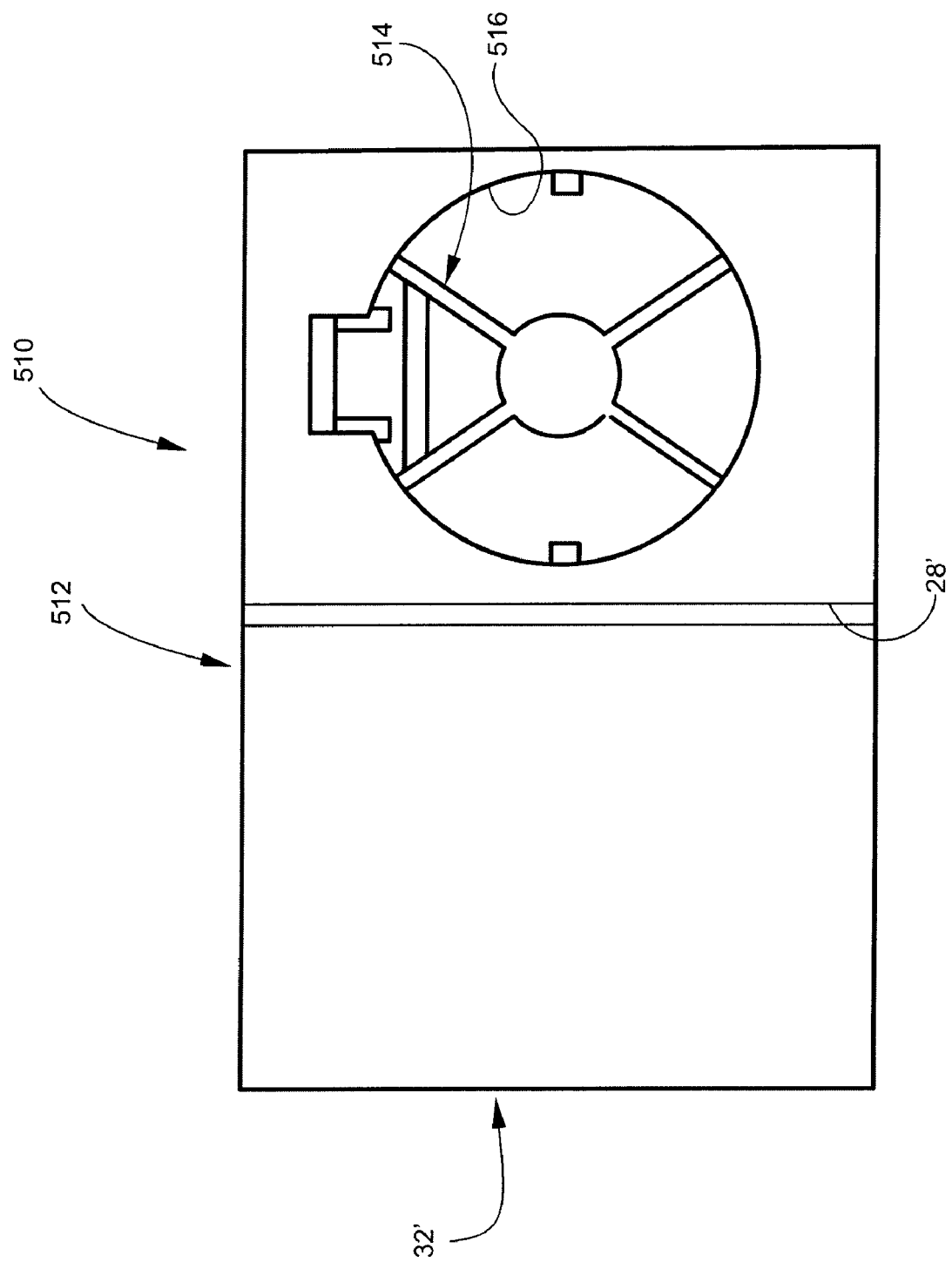
FIG. 27 is a top plan view of an alternative optical media storage package.
Figure 30:
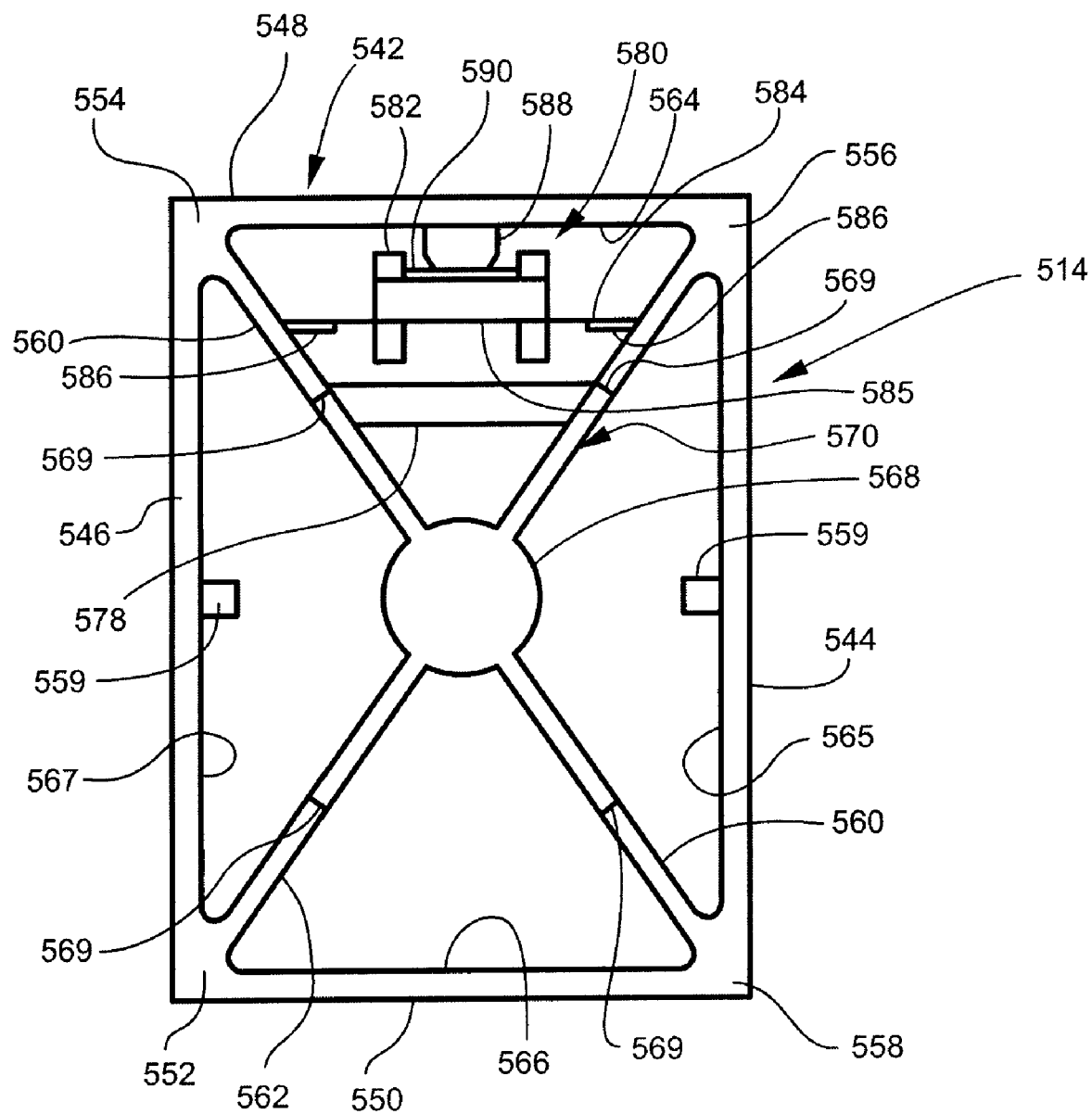
FIG. 30 is a top plan view of the insert of FIG. 27.
Figure 31:
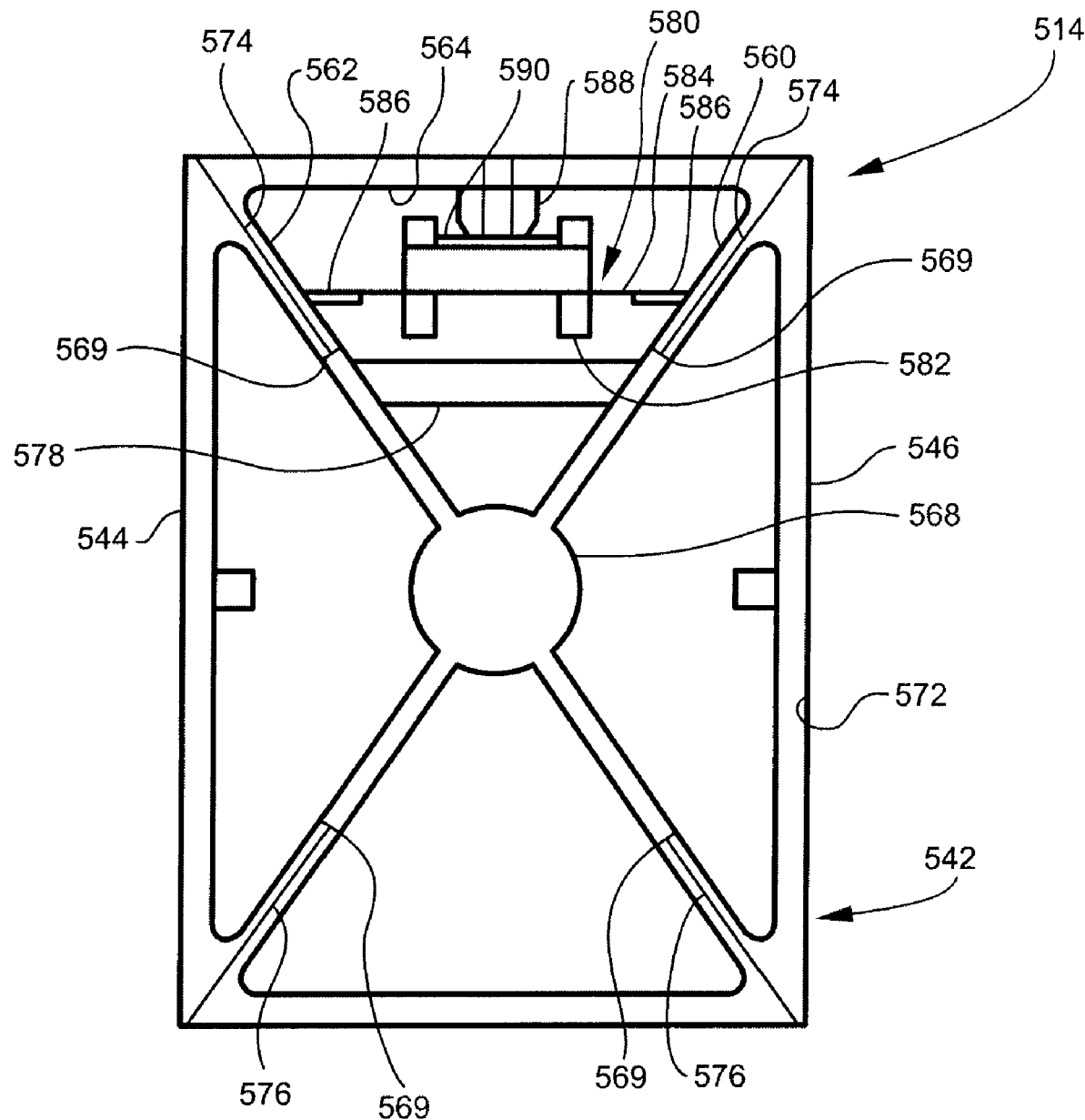
FIG. 31 is a bottom plan view of the insert of FIG. 27.

An optical media storage package according to another embodiment of the invention is shown generally at reference numeral 510 in FIG. 27. The storage package 510 includes a folder 512 wrapped about a disc insert 514. The front and back of the insert 514 are shown in FIGS. 30 and 31. Although the structure of the insert 514 differs from that of the insert 14, the insert 514 is formed from the same materials and can be used to store the same variety of optical media discs as the disc insert 14.

With the exception of adding a disc opening and altering certain spines, hinges and tabs, the folder 512 includes the same components and is formed from the same materials as the folder 12.

Figure 28:
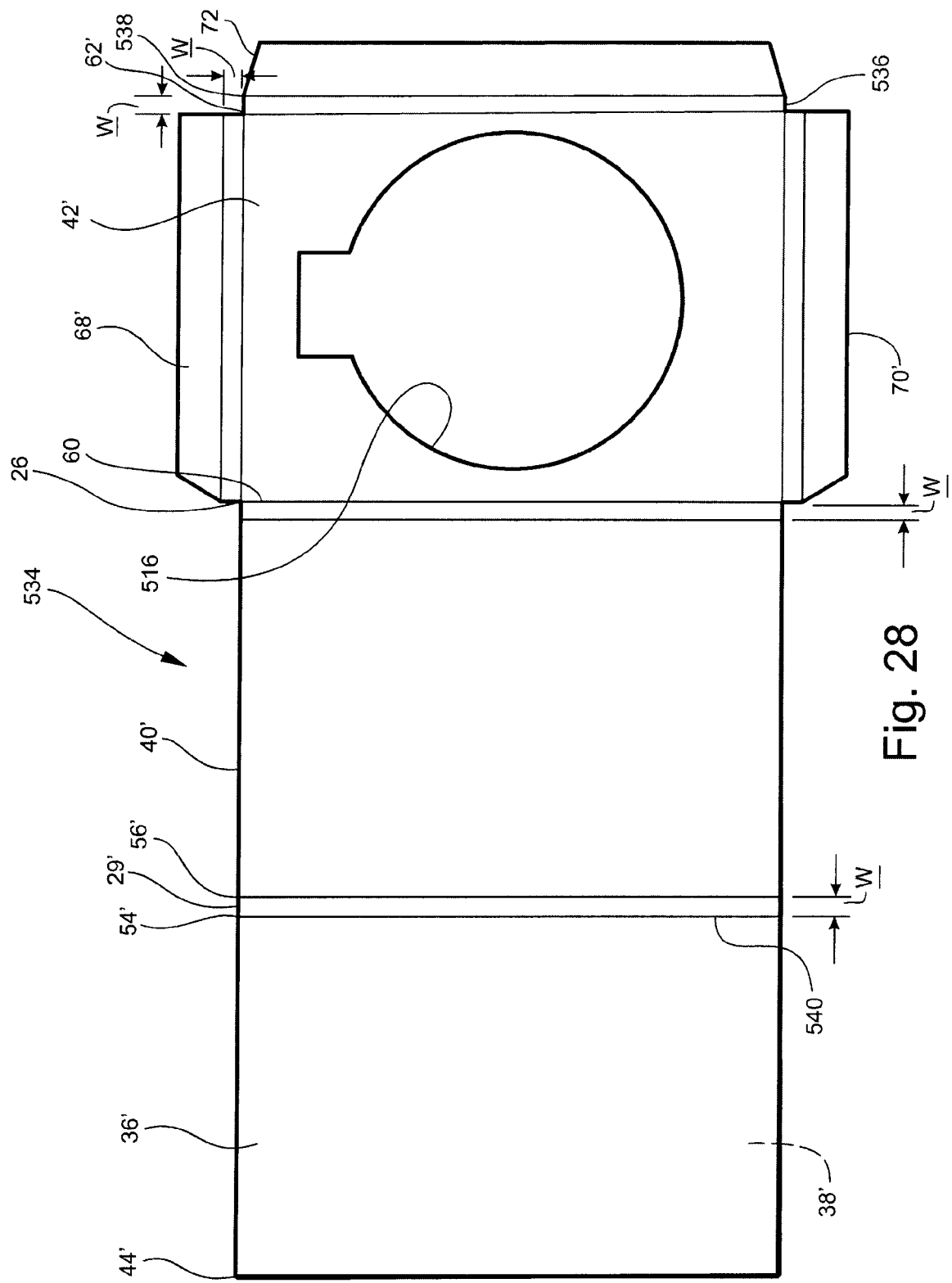
FIG. 28 is a top plan view of a blank used to form a folder for the storage package of FIG. 27.

The folder 512 includes a disc opening 516 for permitting a disc to be placed within, and removed from, the insert 514. As is shown in FIG. 28, the disc opening 516 is formed on the fourth panel 42' of a blank 534 and thus eliminates the need for an opening like that which is formed along the side edge 28' of the folder 10. The blank 534 instead includes a second side spine 536, which is defined by the first side hinge 62' and a second side hinge 538. The blank 534 also lacks the cover tab 52, first and second hinges 46, 48 and the interior cover spine 50 of the folder 10. The first panel 36' of the blank 534 instead extends between an outside edge 540 and the cover hinge 44'.

Figure 29:
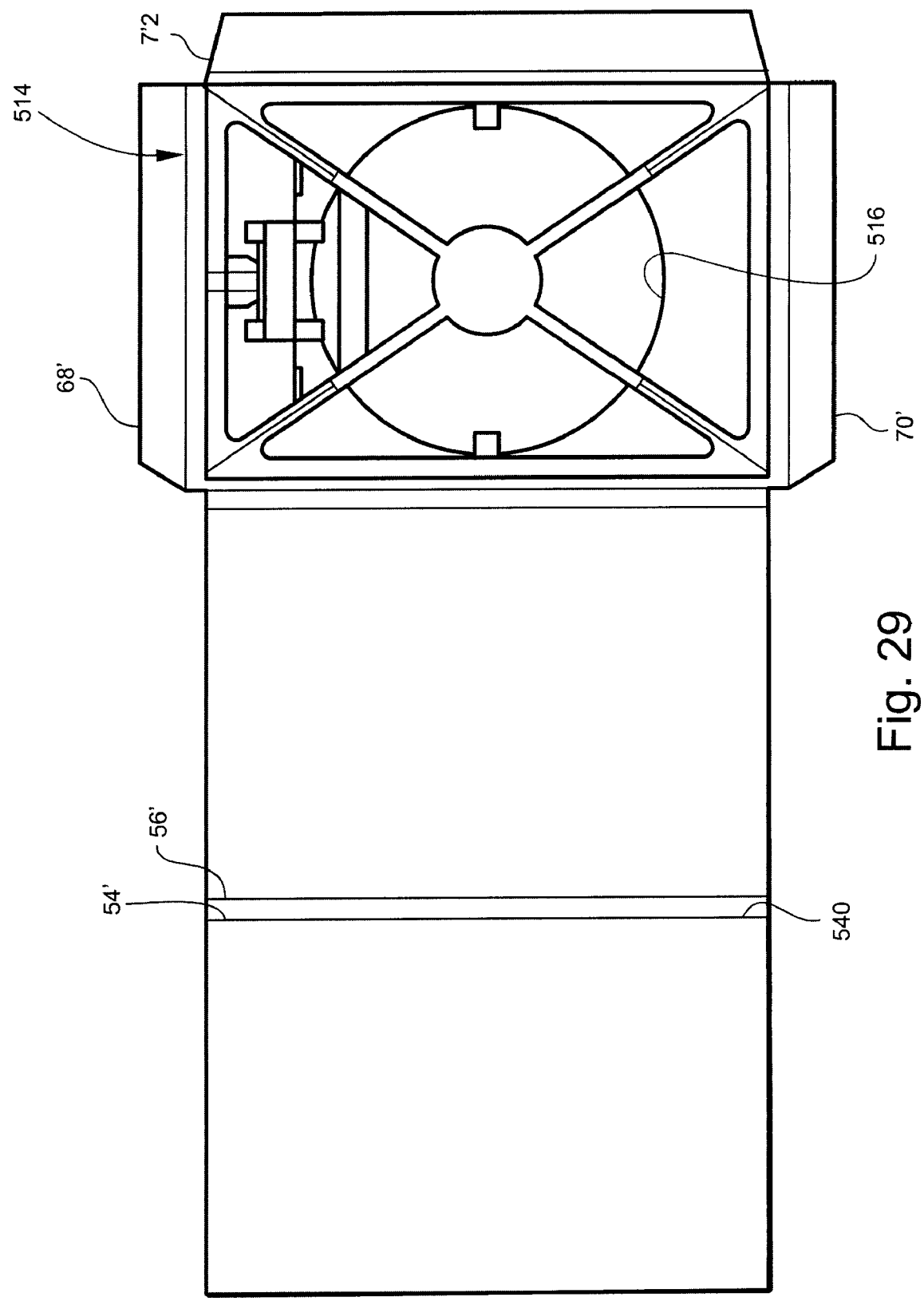
FIG. 29 is a top plan view of the blank and insert of FIG. 27 during assembly.

The storage package 510 is assembled by folding the first panel 36' along the cover hinge 44 and adhesively bonding the first panel 36' against the second panel 38 so that the outside edge 540 extends along the third hinge 54'. It is noted that the first panel 36' is shown already folded over in this manner in FIGS. 27 through 29. As is shown in FIG. 29, the front of the insert 514 is then disposed against the interior surface of the fourth panel 42' so that the insert 514 may be accessed through the disc opening 516 of the assembled folder 512. The upper glue tab 68', lower glue tab 70' and side glue tab 72' are then folded over the insert 514 and are adhered to one another, with the second side spine 536 wrapped around the insert 514 in place of the opening that would otherwise be formed along the side edge 28' of the folder 12. The fourth panel 42' and side spine 29' are next folded along the third and fourth hinges 54', 56' and the glue tabs 68', 70', 72' are adhered to the third panel 40' to arrive at the package 510 shown in FIG. 27. When the cover 32' of the folder 512 is closed, the first side spine 29' is superimposed over the second side spine 536 so that the entire insert 514 is securely enclosed within the interior of the folder 512.

The storage package 510 may alternatively feature a blank, not shown, but similar to the blank 534, in which the disc opening 516 is formed on the third panel 40'. To assemble the package 510, the back of the insert 514 is disposed against the interior surface of the fourth panel 42' so that the front of the insert 514 may be accessed through the disc opening 516 on the third panel after the package 510 is assembled. The remaining components of the blank 534 are wrapped around the insert 514 in a manner identical to that which is described above with reference to FIGS. 27 through 29. The storage package 510 may also alternatively be formed to include five panels, with the second panel hinged and adhesively bonded to the back side of the first panel to create an inside page for use as a storage pocket for printed and other graphic materials.

The storage package 510 may also include a tear-away insert disposed across a portion or overlying the entirety of the opening 516. The insert (not shown) is connected to the folder 12 by a perforated line to permit the insert to be removed by an end user. Such an insert is formed from any suitable material, including but not limited to the same substrate used for the blank 534, or a flexible material other than the die-cut substrate used for the blank 534.

Referring now to FIGS. 30 and 31, the insert 514 consists of an outer frame 542 formed from opposed lateral frame portions 544, 546 that are interconnected by upper and lower frame portions 548, 550 to define first, second, third and fourth corners 552, 554, 556, 558. First and second tabs 559 are formed on the respective lateral frame portions 544, 546 and extend inwardly toward the center of the insert 514 for supporting the outer edge of a disc.

A first diagonal frame support 560 extends from the second corner 554 to the fourth corner 558 and intersects a second diagonal frame support 562, which similarly extends from the first corner 552 to the third corner 556 to define cut-out areas 564, 565, 566, 567.

A central support 568 is disposed at the intersection of the first and second diagonal frame supports 560, 562. The central support 568 and the tabs 559 cooperate with four rim segments 569 to define a disc seat 570. Each of the frame supports 560, 562 includes a pair of rim segments 569, which are disposed on the supports 560, 562 in spaced-apart relation to the central support 568. Each rim segment 569 is integrally formed with and extends perpendicularly to a selected one of the diagonal frame supports 560, 562, which in turn causes the disc seat 570 to be recessed relative to the lateral, upper and lower frame portions 544, 546, 548, 550.

The insert 514 includes features specifically designed to enhance the protection of a disc stored within the seat 570. As is best shown in FIG. 31, the lateral, upper and lower frame portions 544, 546, 548, 550 are reinforced by an outer side rim 572 that extends around the periphery of the outer frame 542. The diagonal frame supports 560, 562 are also reinforced. In particular, pairs of upper and lower support ribs 574, 576 are disposed on the back sides of the diagonal frame supports 560, 562 and extend from the corners of the frame 542 to the rim segments 569. The disc seat 570 is further strengthened by a reinforcing bar 578 that interconnects the upper support ribs 574 above the central support 568.

The reinforcing bar 572 also stabilizes the diagonal frame supports 560, 562 to allow a spring locking mechanism 580 to operate without difficulty. The spring locking mechanism 580 is disposed within the cut-out area 564 below the upper frame portion 548 and features an H-shaped member 582 mounted on a spring 584 which has ends 586 connected to the upper support ribs 574. In the absence of pressure on the spring 584, the web 585 of the H-shaped member 582 abuts a projection 588 which is integral with the upper frame portion 548 and extends toward the central support 568.

To place a disc in the insert 514, the web 585 of the H-shaped member 582 is urged slightly upwards and away from the bar 578, which likewise causes the spring 584 to flex outwardly away from the central support 568. As the spring 584 flexes, the web 545 slides toward the projection 588 so that a lock bar 590 disposed on the back of the H-shaped member 582 slides behind the projection 588 in the manner shown in FIGS. 30 and 31. This causes the H-shaped member 582 to move away from the central support 568 so that a disc can be placed in the insert 514. The spring locking mechanism 580 returns to its original position when the lock bar 590 on the H-shaped member 582 is released from the projection 588.

The central support 568 may alternatively be formed with an opening like the opening 345 described above for permitting an end user to insert a finger in the opening to remove the disc from the tray.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the claims.

What is claimed is:

1. An insert for a media disc storage package, comprising:
   (a) a tray having a generally planar floor and at least one upstanding rim extending from the floor so as to define an open disc well adapted to receive and locate a media disc therein;
   (b) a frame having an outer perimeter, the frame carrying the tray so that the tray is moveable, in a plane generally parallel to the floor, between:
      (i) a first position in which the disc well is disposed inside the outer perimeter of the frame, and (ii) a second position in which the disc well extends at least partially outside the perimeter of the frame; and (c) a spring locking mechanism comprising:
  (i) a flexible spring having at least one end connected to the insert; and
  (ii) a latch extending laterally from the spring, the latch being moveable with the spring, in a plane generally parallel to the floor, between:
    (A) a first position in which at least a portion of the latch overlies the disc well; and
    (B) a second position in which the latch is clear of the disc well.

2. The insert of claim 1 wherein the tray is carried for sliding movement relative to the frame.

3. The insert of claim 1 wherein the tray is carried for pivoting movement relative to the frame.

4. The insert of claim 3 wherein the tray and the frame are interconnected by a hinge which is integrally-molded with the tray and the frame.

5. The insert of claim 1 further comprising a disc keeper which extends laterally from the upstanding rim so as to cover a portion of the disc well.

6. A media disc storage package, comprising:
  (a) a folder comprising at least first and second spaced-apart panels defining a space for enclosing a media disc;
  (b) spines interconnecting the first and second panels to form a substantially continuous outer surface which includes an open side edge; and
  (c) the insert of claim 1 disposed between the first and second panels.

7. The media disc storage package of claim 6 wherein the folder further includes a cover flap moveable between a closed position overlying the first panel, and an open position in which the first panel is exposed.

8. The media disc storage package of claim 6 wherein:
  (a) the folder includes at least one flap extending from an outer edge of one of the panels, the flap folded over and overlying a portion of the insert, and having an opening formed therethrough; and
  (b) the insert includes a boss complementary to the opening and a hook received in the opening so as to secure the flap to the insert.

9. The media disc storage package of claim 6 wherein the spring extends at least partially through the open side edge in the second position.

10. The media disc storage package of claim 6 in which the insert includes alignment means for retaining the tray in the first position and aligned substantially coplanar to the frame, the alignment means being selectively releasable.

* * * * *